US010508758B2

(12) United States Patent
Sprague et al.

(10) Patent No.: US 10,508,758 B2
(45) Date of Patent: Dec. 17, 2019

(54) REINFORCEMENT ASSEMBLY FOR A BRACKET OF A SPENT FUEL POOL

(71) Applicant: GE-Hitachi Nuclear Energy Americas LLC, Wilmington, NC (US)

(72) Inventors: Robin D. Sprague, Leland, NC (US); Steven Lewis Brown, Wilmington, NC (US); Brandon Jay Schoonmaker, Hampstead, NC (US); Shaobo Liu, Wilmington, NC (US); Neill MacGregor Graham, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 66 days.

(21) Appl. No.: 15/944,266

(22) Filed: Apr. 3, 2018

(65) Prior Publication Data

US 2019/0301643 A1    Oct. 3, 2019

(51) Int. Cl.
*F16L 3/00* (2006.01)
*F16L 3/22* (2006.01)
*G21C 13/02* (2006.01)
*F16L 3/10* (2006.01)
*F16L 3/237* (2006.01)

(52) U.S. Cl.
CPC ............. *F16L 3/222* (2013.01); *F16L 3/10* (2013.01); *F16L 3/237* (2013.01); *G21C 13/02* (2013.01)

(58) Field of Classification Search
CPC ....... F16L 13/222; F16L 13/10; F16L 13/237; F16L 13/1075; G21C 13/02

USPC ................ 248/49, 58, 65, 73; 174/68.1
See application file for complete search history.

(56) References Cited

U.S. PATENT DOCUMENTS

| | | | |
|---|---|---|---|
| 4,143,844 A | 3/1979 | Van Meter | |
| 4,675,149 A | 6/1987 | Perry et al. | |
| 4,762,266 A | 8/1988 | Schroder et al. | |
| 4,978,090 A | 12/1990 | Wichert et al. | |
| 6,456,682 B1 | 9/2002 | Jensen | |
| 6,647,083 B1 | 11/2003 | Jensen | |
| 6,857,814 B2 | 2/2005 | Jensen | |
| 7,272,204 B2 | 9/2007 | Jensen | |
| 7,724,863 B2 | 5/2010 | Jensen | |
| 7,802,825 B2 | 9/2010 | Jensen | |
| 8,045,672 B2 | 10/2011 | Jensen et al. | |

(Continued)

FOREIGN PATENT DOCUMENTS

CA    2935675 A1 *  1/2017  ............... H02G 1/06

*Primary Examiner* — Todd M Epps
(74) *Attorney, Agent, or Firm* — Harness, Dickey & Pierce, P.L.C.

(57) ABSTRACT

A reinforcement assembly may be provided for a bracket configured to constrain a cooling pipe of a spent fuel pool of a nuclear reactor. The reinforcement assembly includes a base structure defining back slots, angled slots, side slots, and/or front slots. Back boss structures may be configured to slidably engage with the back slots of the base structure. Pipe boss structures may be configured to slidably engage with the angled slots of the base structure. Side clamps may be configured to slidably engage with the side slots of the base structure. Each of the side clamps may define a vertical slot. Vertical clamps may be configured to slidably engage with the vertical slot of each of the side clamps. Front clamps may be configured to slidably engage with the front slots of the base structure.

20 Claims, 48 Drawing Sheets

(56) References Cited

U.S. PATENT DOCUMENTS

| | | |
|---|---|---|
| 8,045,673 B2 | 10/2011 | Jensen |
| 8,170,174 B1 | 5/2012 | Lentner et al. |
| 8,249,212 B2 | 8/2012 | Jensen et al. |
| 8,391,437 B2 * | 3/2013 | Lentner .................... F04F 5/54 376/347 |
| 8,567,353 B2 * | 10/2013 | DeFilippis ............ F22B 37/204 122/511 |
| 8,983,018 B2 * | 3/2015 | Lentner .................. G21C 15/25 376/392 |
| 2012/0087456 A1 | 4/2012 | Suganuma et al. |
| 2014/0362967 A1 | 12/2014 | Ozawa et al. |
| 2015/0159781 A1 * | 6/2015 | Wilson ................... F16L 3/227 248/67.5 |

\* cited by examiner

530'

REINFORCEMENT ASSEMBLY FOR A BRACKET OF A SPENT FUEL POOL

BACKGROUND

Field

The present disclosure relates to arrangements configured to reinforce structures of a nuclear reactor.

Description of Related Art

Existing components within a spent fuel pool of a nuclear reactor may be at risk of failure as a result of seismic activity. Consequently, such components may need to be reinforced or replaced.

SUMMARY

A reinforcement assembly may be provided for a bracket configured to constrain a cooling pipe of a spent fuel pool of a nuclear reactor. The reinforcement assembly includes a base structure defining a pair of back slots, a pair of angled slots, a pair of side slots, and/or a pair of front slots. A pair of back boss structures may be configured to slidably engage with the pair of back slots of the base structure. A pair of pipe boss structures may be configured to slidably engage with the pair of angled slots of the base structure. A pair of side clamps may be configured to slidably engage with the pair of side slots of the base structure. Each of the pair of side clamps may define a vertical slot. A pair of vertical clamps may be configured to slidably engage with the vertical slot of each of the pair of side clamps. A pair of front clamps may be configured to slidably engage with the pair of front slots of the base structure.

The base structure may be configured to cover the bracket. The base structure may be a monolithic component.

The one or more of the pair of back slots, the pair of angled slots, the pair of side slots, the pair of front slots, and the vertical slot may include a portion in a form of a T-slot.

The pair of back boss structures may be configured to move away from each other to contact the bracket. Each of the pair of back boss structures may have a slidable range of ±12.5 mm.

The pair of pipe boss structures may be configured to protrude inward from the base structure and toward each other. Each of the pair of pipe boss structures may have a slidable range of ±17.5 mm.

The pair of side clamps may be configured to move toward each other to contact the bracket. Each of the pair of side clamps may have a slidable range of ±12.5 mm.

The pair of vertical clamps may be configured to move toward the base structure so as to contact a bottom surface of the bracket. Each of the pair of vertical clamps may have a slidable range of ±8.5 mm.

The pair of front clamps may be configured to move into the base structure and toward the pair of back slots so as to contact the bracket. Each of the pair of front clamps may have a slidable range of ±12.5 mm.

The reinforcement assembly may further include at least one spacer configured to engage with at least one of the pair of back boss structures. The at least one spacer may be configured to be pressed against the bracket by the pair of back boss structures. The at least one spacer is configured to allow for centroid loading through a center of rotation of a local cross-section of the bracket to reduce torsional shear stress. The at least one spacer may be in a form of two spacers. Alternatively, the at least one spacer may be in a form of a single spacer.

The reinforcement assembly may further include a linkage structure connected to the base structure and a swing gate connected to the linkage structure. The swing gate may be configured to hold and stabilize a probe pipe relative to the cooling pipe.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
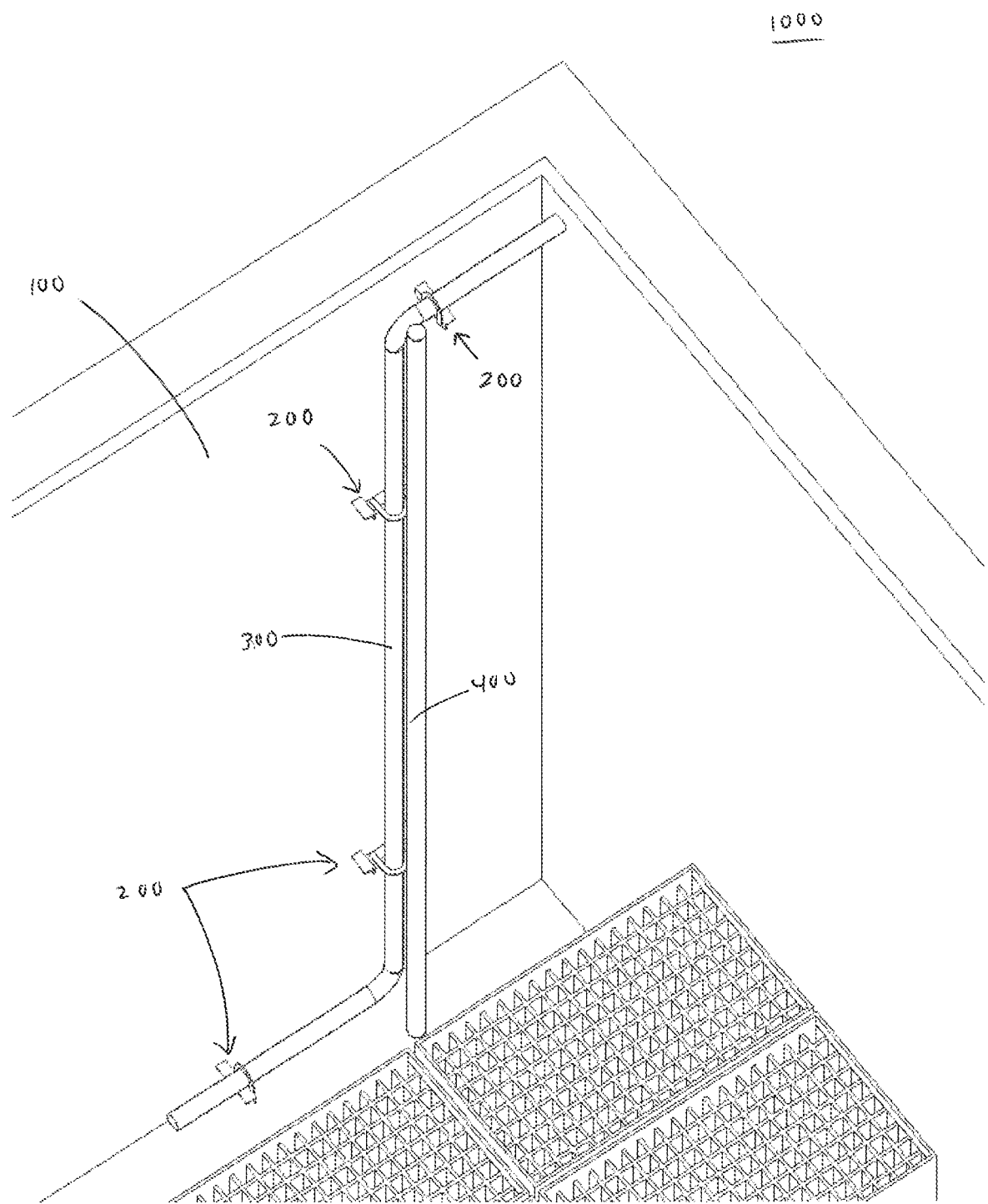
FIG. 1 is a partial, perspective view of a spent fuel pool of a nuclear reactor including a cooling pipe, a probe pipe, and a plurality of brackets according to an example embodiment.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

FIG. 1 is a partial, perspective view of a spent fuel pool of a nuclear reactor including a cooling pipe, a probe pipe, and a plurality of brackets according to an example embodiment. Referring to FIG. 1, a spent fuel pool 1000 includes, inter alia, a cooling pipe 300 and a probe 400 adjacent to the cooling pipe 300. The probe 400 may be a water level and temperature probe. The cooling pipe 300 includes a vertical (riser) portion between two horizontal portions. The two horizontal portions of the cooling pipe 300 may extend in opposite directions. As shown in FIG. 1, the cooling pipe 300 is constrained to a liner 100 of a wall (e.g., south wall) of the spent fuel pool 1000 by a plurality of brackets 200. The brackets 200 constraining the vertical (riser) portion of the cooling pipe 300 may be different from the brackets 200 constraining the horizontal portions. Although not shown, another cooling pipe 300 may be constrained to an opposing wall (e.g., north wall) of the spent fuel pool 1000. In a non-limiting embodiment, the probe 400 is paired with one of the cooling pipes 300 (e.g., on the south wall) of the spent fuel pool 1000.

Figure 2:
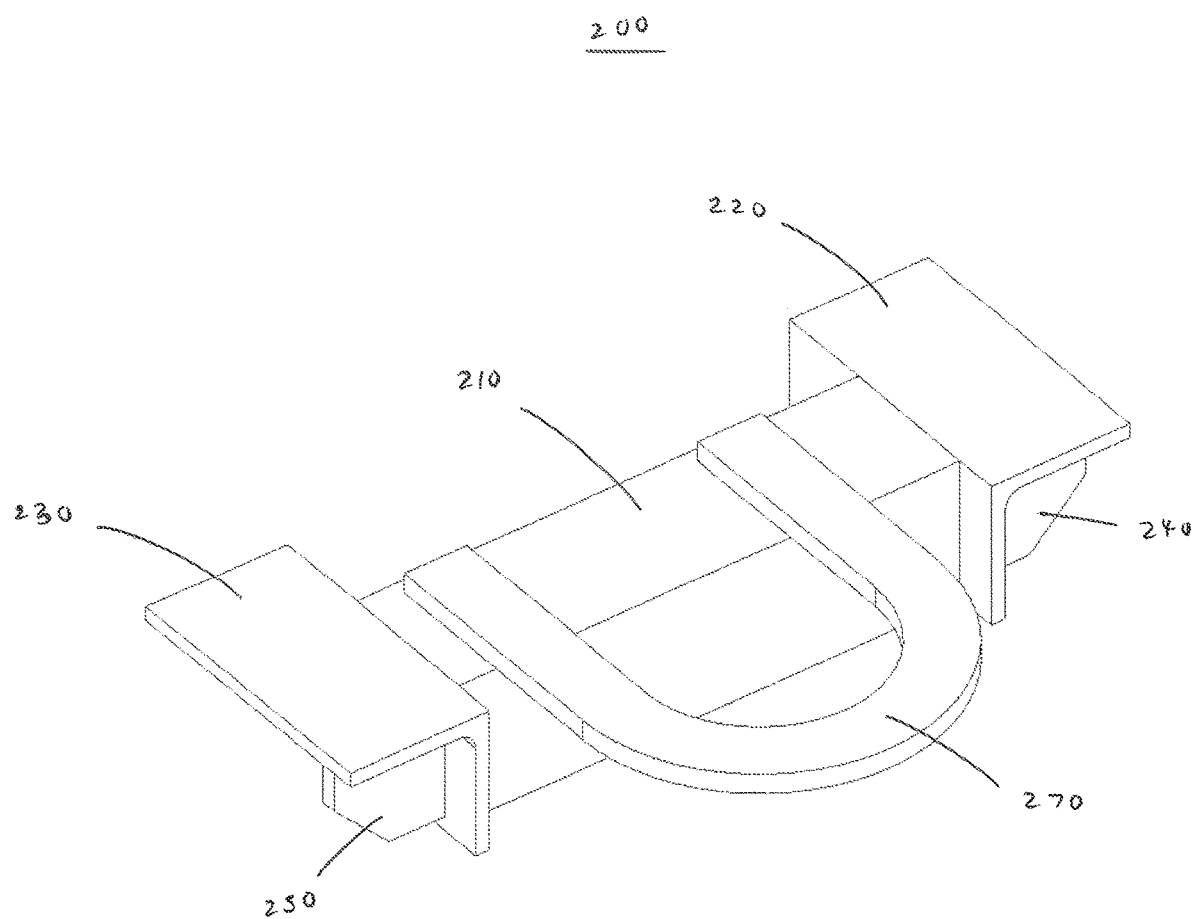
FIG. 2 is an upper perspective view of one of the plurality of brackets of FIG. 1.

FIG. 2 is an upper perspective view of one of the plurality of brackets of FIG. 1. Referring to FIG. 2, the bracket 200 is configured to constrain the cooling pipe 300 and includes a center angle 210 secured (e.g., welded) between a first side angle 220 (e.g., right angle) and a second side angle 230 (e.g., left angle). The center angle 210, first side angle 220, and second side angle 230 may have dimensions (width× height×thickness) of 100 mm×100 mm×10 mm, although example embodiments are not limited thereto. The first side angle 220 is reinforced by a first gusset 240. Similarly, the second side angle 230 is reinforced with a second gusset 250. A U-bracket section 270 is secured to the center angle 210. When the bracket 200 is installed in the spent fuel pool 1000, the cooling pipe 300 will be constrained between the U-bracket section 270 and the center angle 210.

Figure 3:
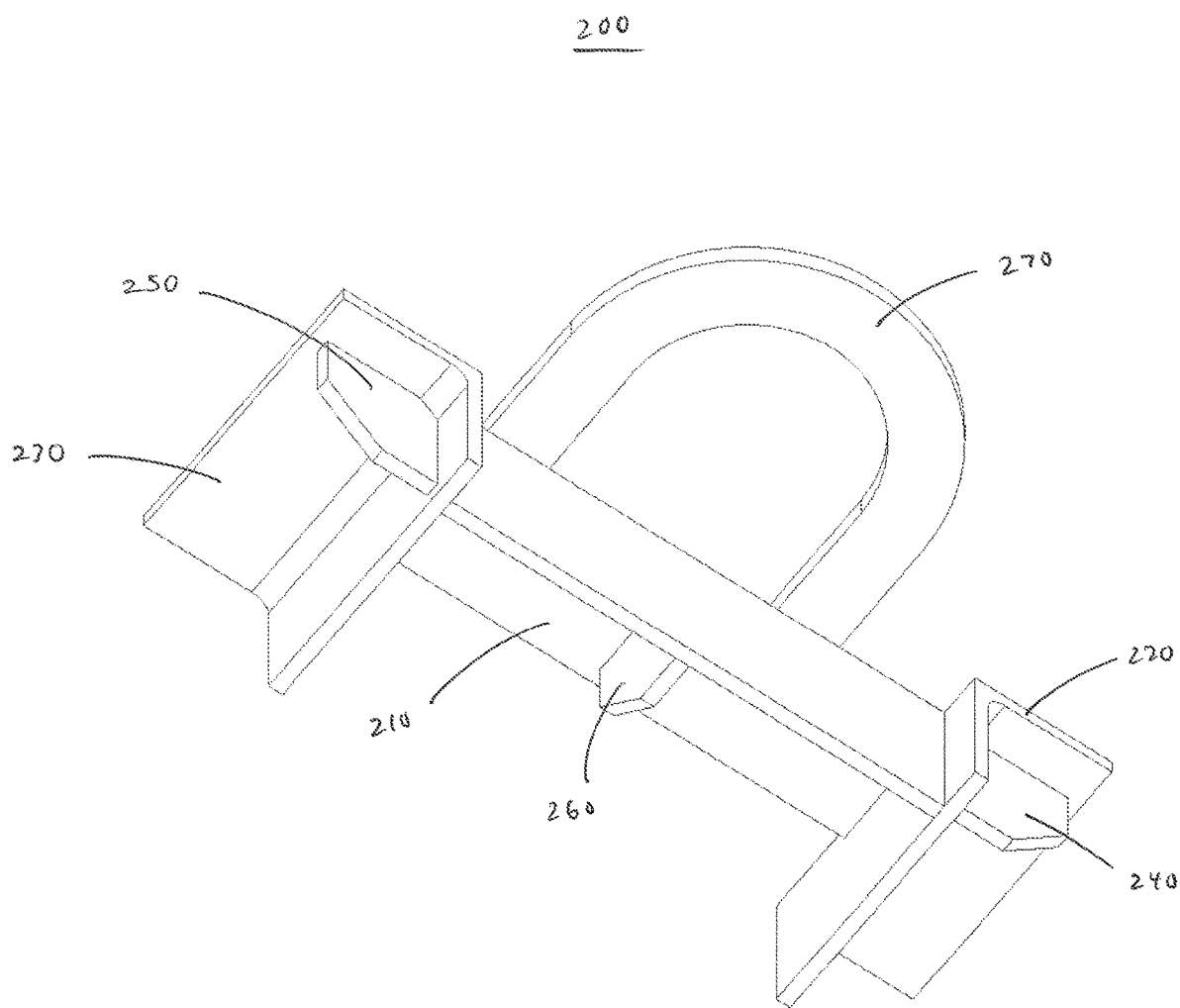
FIG. 3 is a lower perspective view of the bracket of FIG. 2.

FIG. 3 is a lower perspective view of the bracket of FIG. 2. Referring to FIG. 3, the center angle 210 is reinforced with a third gusset 260. The combination of the center angle 210, the first side angle 220, the second side angle 230, the first gusset 240, the second gusset 250, and the third gusset 260 may be referred to as an H-bracket section. Thus, the bracket 200 may be regarded as having an H-bracket section and a U-bracket section 270.

Figure 4:
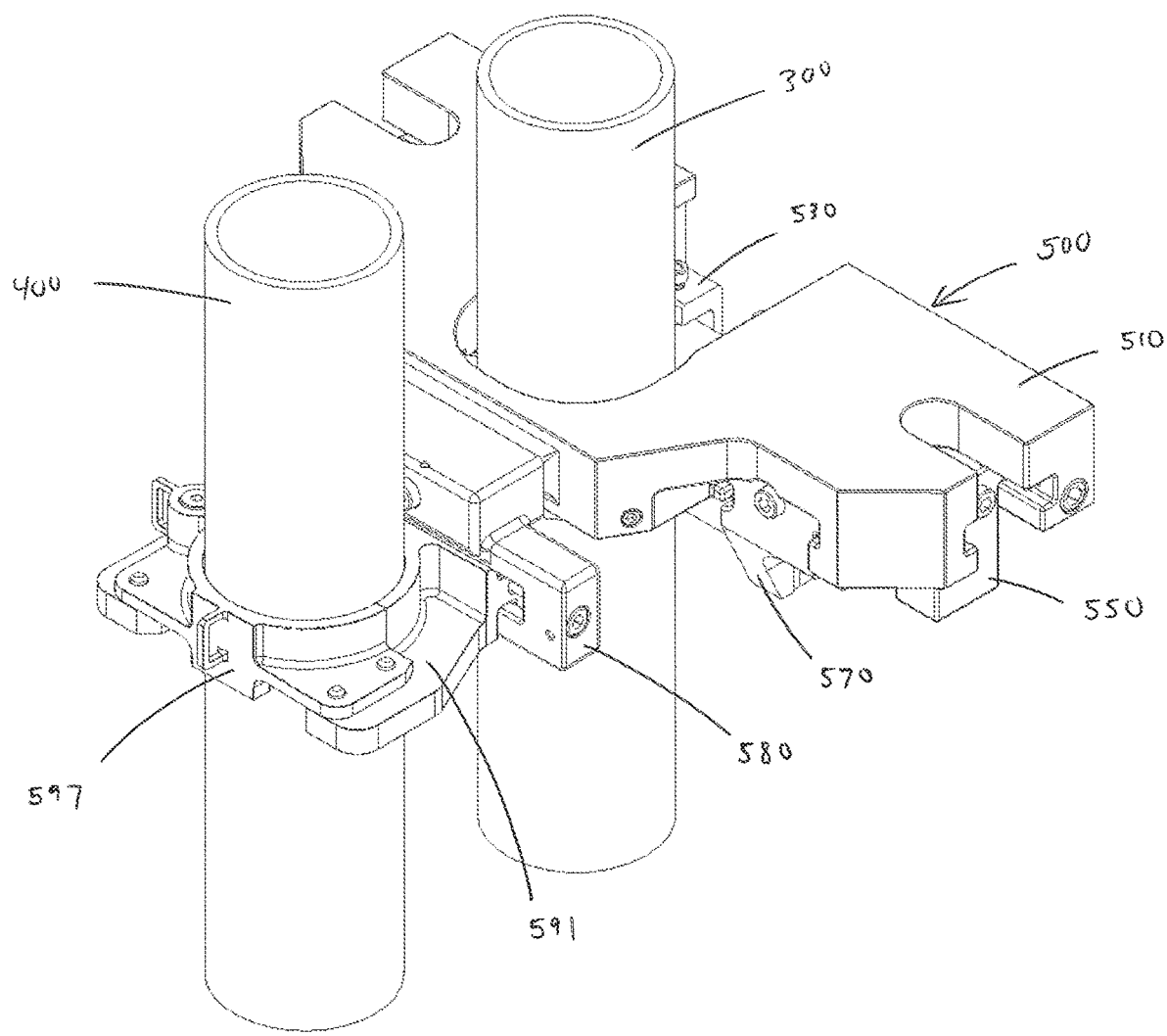
FIG. 4 is an upper perspective view of a reinforcement assembly for the bracket of FIG. 2.

FIG. 4 is an upper perspective view of a reinforcement assembly for the bracket of FIG. 2. Referring to FIG. 4, a reinforcement assembly 500 is configured for installation in the spent fuel pool 1000 to reinforce or strengthen at least one of the brackets 200. For instance, a reinforcement assembly 500 may be provided for each of the two brackets 200 that constrain the vertical (riser) portion of the cooling pipe 300, although example embodiments are not limited thereto. The reinforcement assembly 500 has a design that allows for remote installation (e.g., via chain hoist and without the use of divers). By reinforcing the bracket 200, the reinforcement assembly 500 helps to constrain the cooling pipe 300 while optionally also stabilizing the probe 400. The reinforcement assembly 500 is described generally below and is followed by more detailed discussions in subsequent sections.

In FIG. 4, the bracket 200 constraining the cooling pipe 300 is covered by the reinforcement assembly 500 and, thus, is mostly hidden from view in the drawing. The reinforcement assembly 500 includes a base structure 510 defining a plurality of slots. A plurality of boss structures and clamps are slidably engaged with the plurality of slots in the base structure 510 so as to provide the reinforcement assembly 500 with a desirable level of adjustability with regard to the interaction with and resulting reinforcement of the bracket 200. As discussed in further detail herein, the plurality of boss structures and clamps of the reinforcement assembly 500 include, inter alia, side clamps 550 and front clamps 570.

The reinforcement assembly 500 may additionally include a linkage structure 580 connected to the base structure 510 and a swing gate connected to the linkage structure 580. The swing gate includes a gate base 591 and a gate latch 597. In an example embodiment where the reinforcement assembly 500 is installed in a spent fuel pool 1000 to reinforce a bracket 200 (e.g., existing bracket), the swing gate allows the probe 400 to be subsequently installed in a horizontal manner in the spent fuel pool 1000. Furthermore, the reinforcement assembly 500 may include spacers 530 when the linkage structure 580 and swing gate are provided to stabilize the probe 400.

Figure 5:
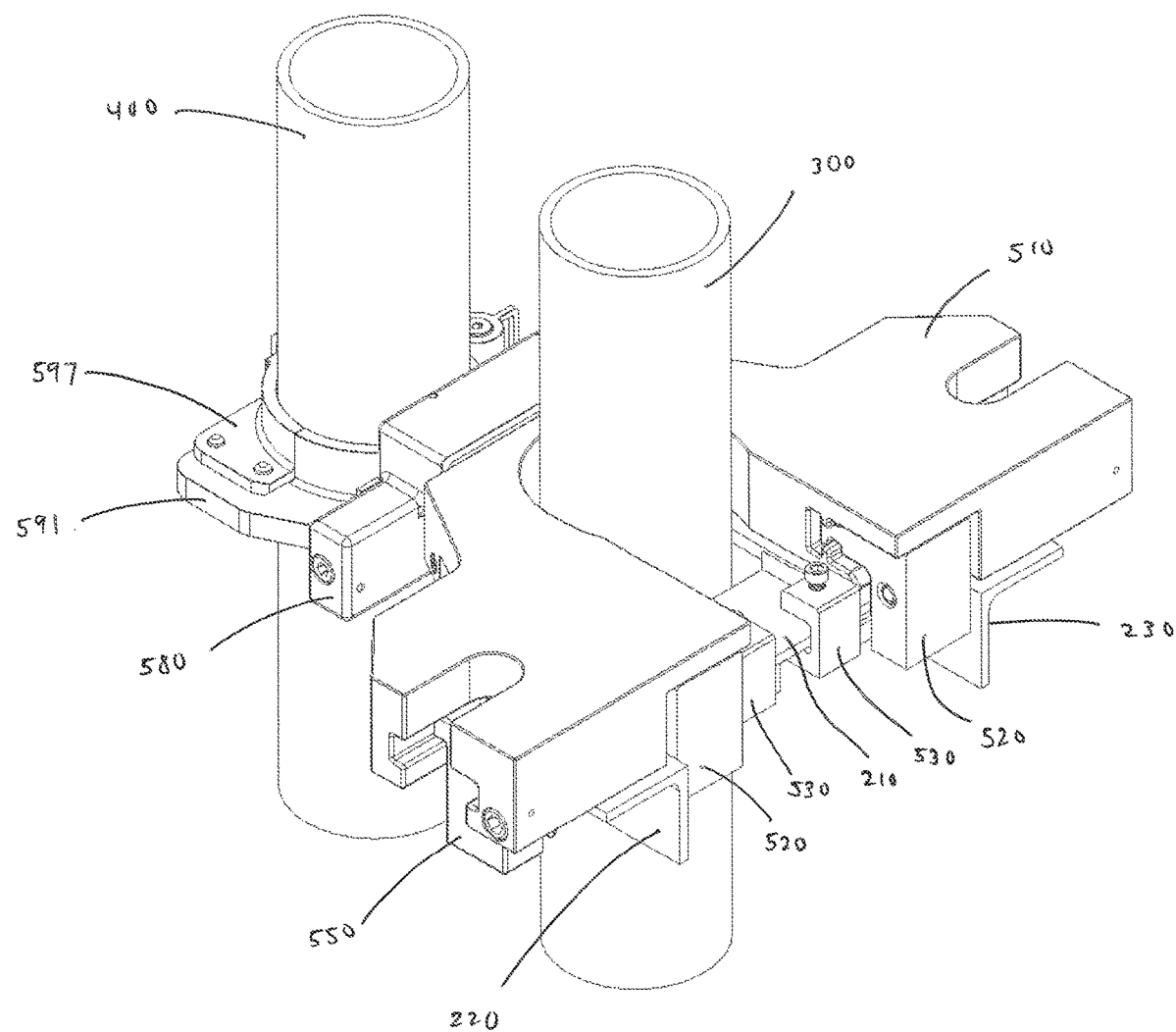
FIG. 5 is another upper perspective view of the reinforcement assembly of FIG. 4.

FIG. 5 is another upper perspective view of the reinforcement assembly of FIG. 4. Referring to FIG. 5, the reinforcement assembly 500 includes back boss structures 520 configured to interact with the first side angle 220 and the second side angle 230 of the bracket 200. The spacers 530 are configured to interact with both the center angle 210 and the back boss structures 520.

Figure 6:
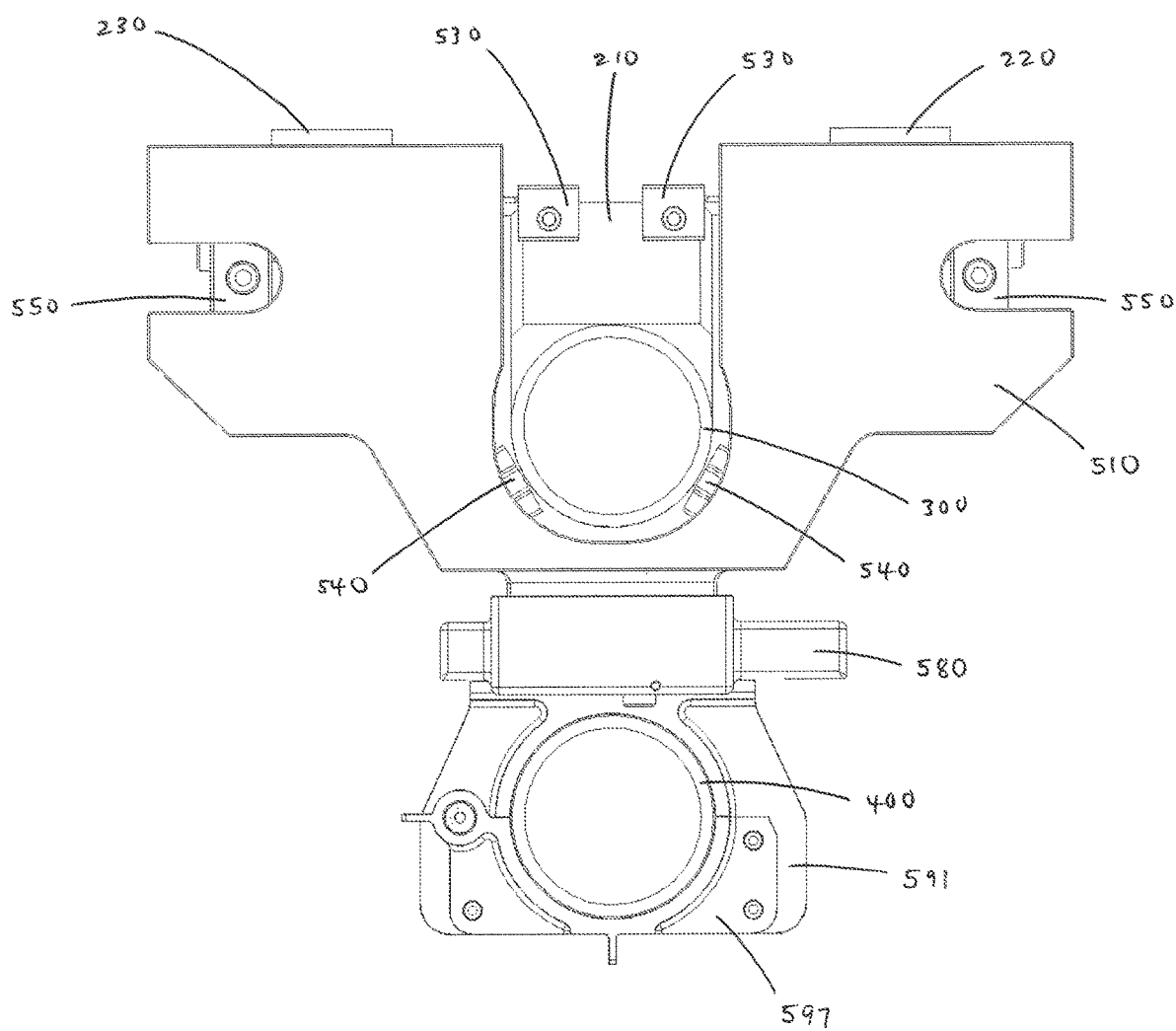
FIG. 6 is a plan view of the reinforcement assembly of FIG. 4.

FIG. 6 is a plan view of the reinforcement assembly of FIG. 4. Referring to FIG. 6, the reinforcement assembly 500 includes pipe boss structures 540 configured to interact with the cooling pipe 300. As a result, the cooling pipe 300 is constrained by the center angle 210 and the U-bracket section 270 of the bracket 200 while also being constrained by the pipe boss structures 540 (e.g., 1.6 mm radial gap). The side clamps 550 of the reinforcement assembly 500 are configured to interact with the first side angle 220 and the second side angle 230 of the bracket 200. In an example embodiment, the reinforcement assembly 500 is configured to withstand at least 44-50 kN of tangential force and at least 28-34 kN of normal force with regard to the cooling pipe 300.

The swing gate is configured such that the gate base 591 and the gate latch 597 define an inner circumference that coincides relatively closely with the outer circumference of the probe 400 so as to provide a relatively close fit (e.g., 1.6 mm radial gap) for the probe 400. In an example embodiment, the reinforcement assembly 500 is configured to withstand at least 33-39 kN of tangential force and at least 26-32 kN of normal force with regard to the probe 400.

Figure 7:
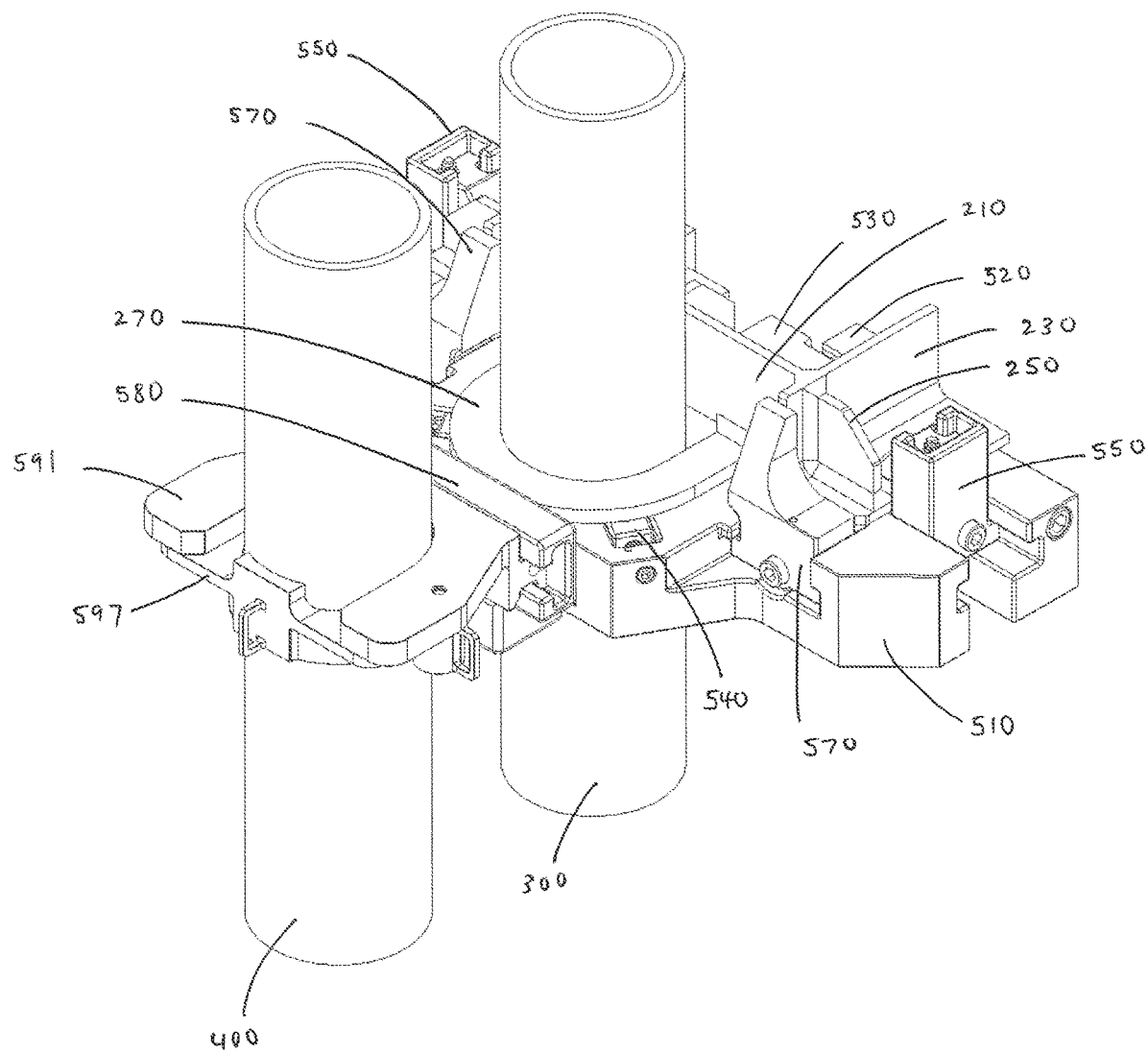
FIG. 7 is a lower perspective view of the reinforcement assembly of FIG. 4.

FIG. 7 is a lower perspective view of the reinforcement assembly of FIG. 4. Referring to FIG. 7, the base structure 510 is dimensioned such that the reinforcement assembly 500 can be situated on the bracket 200 without the U-bracket section 270 interfering with the linkage structure 580. In an example embodiment, the pipe boss structures 540 are between the base structure 510 and the U-bracket section 270 when the reinforcement assembly 500 is installed on the bracket 200. The pair of front clamps 570 are configured to move into the base structure 510 to interact with the first side angle 220 and the second side angle 230 of the bracket 200. For example, the front clamps 570 may press against the L-shaped ends of the first side angle 220 and the second side angle 230.

Figure 8:
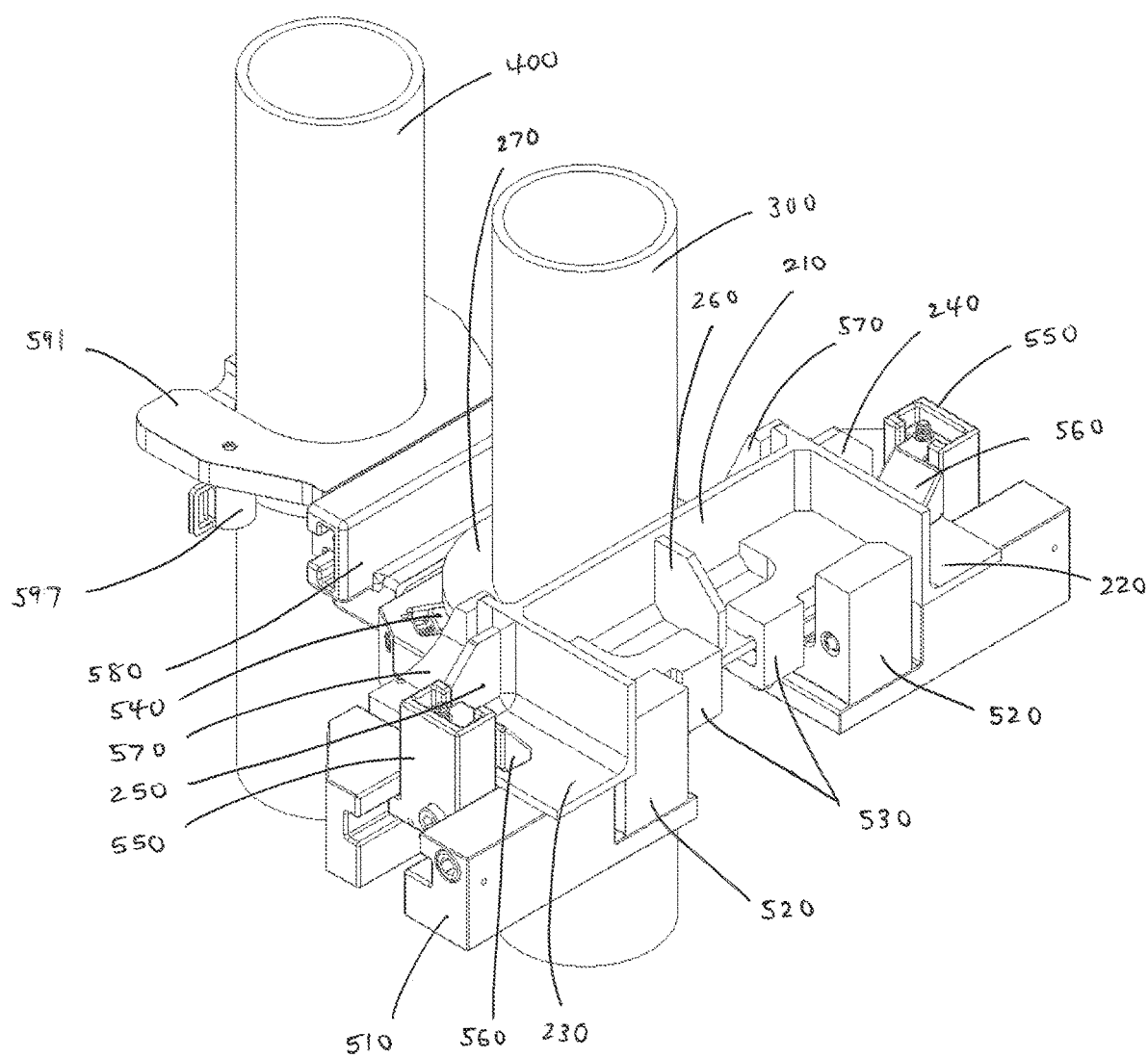
FIG. 8 is another lower perspective view of the reinforcement assembly of FIG. 7.

FIG. 8 is another lower perspective view of the reinforcement assembly of FIG. 7. Referring to FIG. 8, the spacers 530 are positioned on the center angle 210 so as to be on both sides of the third gusset 260. In a non-limiting embodiment, the spacers 530 contact both the undersurface of the horizontal portion of the center angle 210 and the rear side surface of the vertical portion of the center angle 210. The spacers 530 are configured to allow for centroid loading through a center of rotation of a local cross-section of the bracket 200 to reduce torsional shear stress. With regard to the center angle 210, the centroid is between the undersurface of the horizontal portion and the adjacent rear side surface of the vertical portion. In an example embodiment, for a center angle 210 with dimensions (width×height×thickness) of 100 mm×100 mm×10 mm, the centroid is about 28.2 mm to 28.4 mm from the adjacent outer surfaces (e.g., top surface of the horizontal portion and adjacent front side surface of the vertical portion) of the center angle 210.

The pair of back boss structures 520 are configured to move away from each other to contact the first side angle 220 and the second side angle 230 of the bracket 200. For example, the back boss structures 520 may press against opposing side surfaces of the vertical portions of the first side angle 220 and the second side angle 230. Conversely, the pair of side clamps 550 are configured to move toward each other to contact the first side angle 220 and the second side angle 230 of the bracket 200. For example, the side clamps 550 may press against edges of the horizontal portions of the first side angle 220 and the second side angle 230.

A vertical clamp 560 is engaged with a slot defined in each of the side clamps 550. The pair of vertical clamps 560 are configured to move toward the base structure 510 so as to contact a bottom surface of the bracket 200. For example, the vertical clamps 560 may press against undersurfaces of the horizontal portions of the first side angle 220 and the second side angle 230. Although not shown, the dimensions of the vertical clamps 560 may be increased such that the vertical clamps 560 contact both the undersurfaces of the horizontal portions of the first side angle 220 and the second side angle 230 as well as the side surfaces of the vertical portions of the first side angle 220 and the second side angle 230. Such a configuration would allow for centroid loading through a center of rotation of a local cross-section of the bracket 200 to reduce torsional shear stress. For a first side angle 220 and a second side angle 230 with dimensions (width×height×thickness) of 100 mm×100 mm×10 mm, the centroid is about 28.2 mm to 28.4 mm from the top surface and adjacent side surface of each of the first side angle 220 and the second side angle 230.

Figure 9:
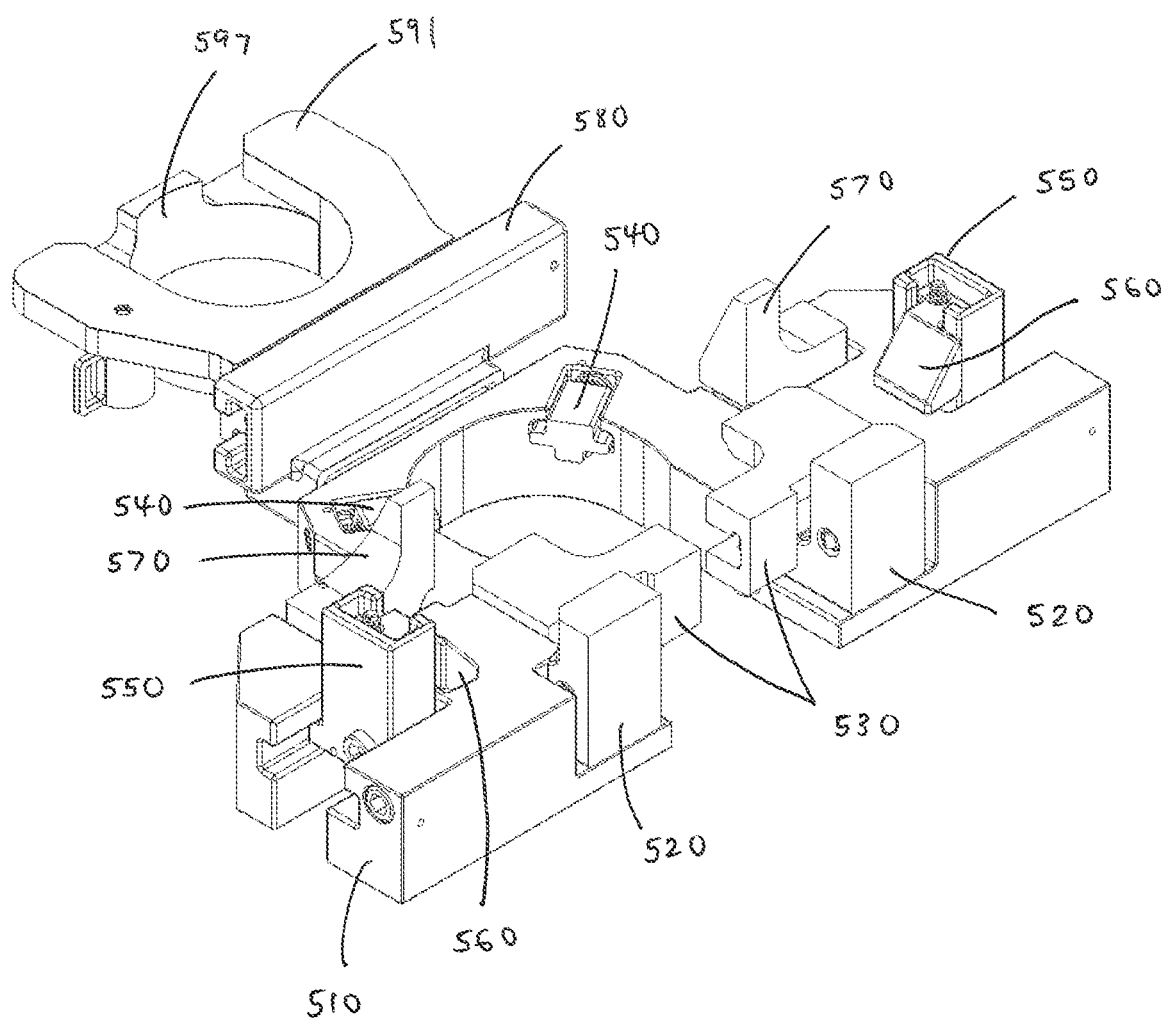
FIG. 9 is a lower perspective view of the reinforcement assembly of FIG. 8 without the cooling pipe, the probe pipe, and the bracket.
Figure 10:
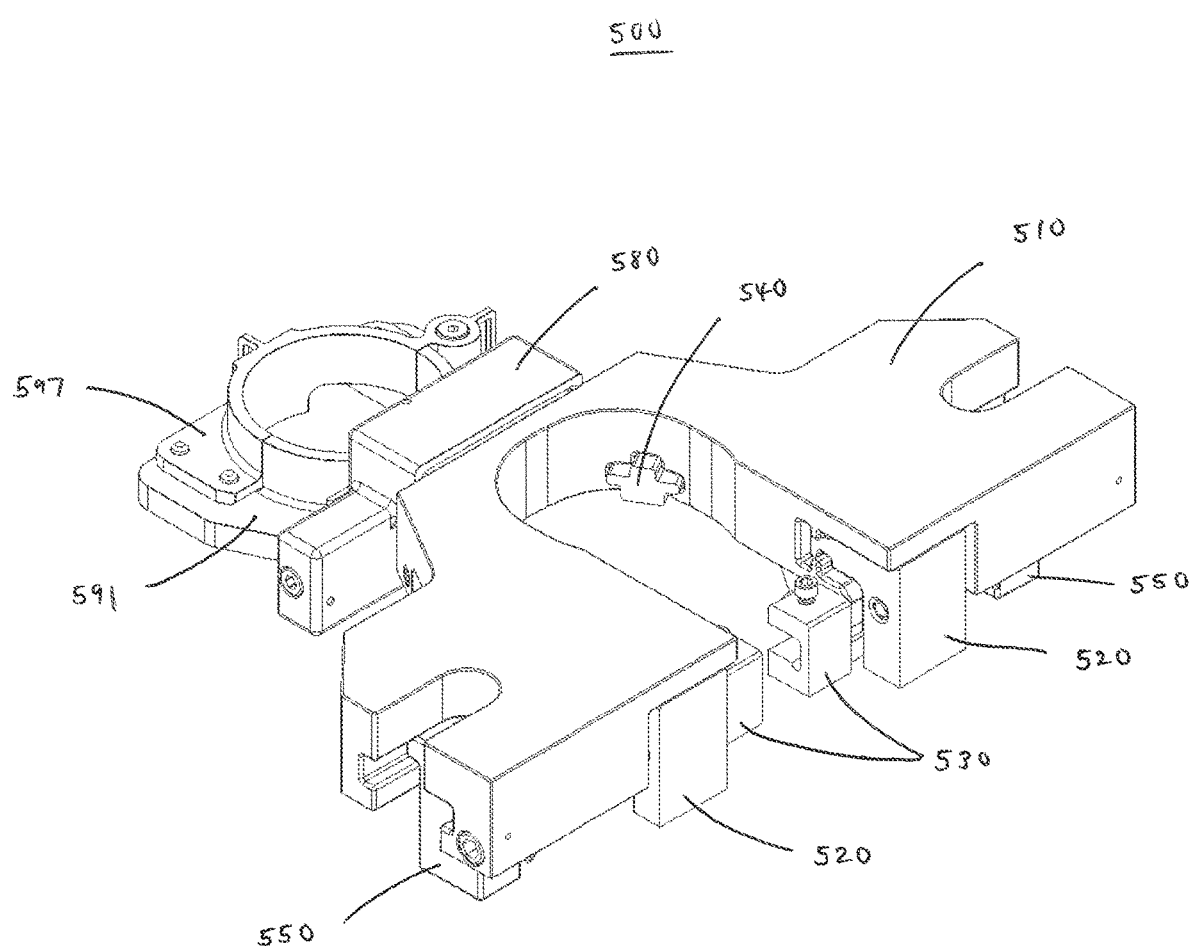
FIG. 10 is an upper perspective view of the reinforcement assembly of FIG. 9.
Figure 11:
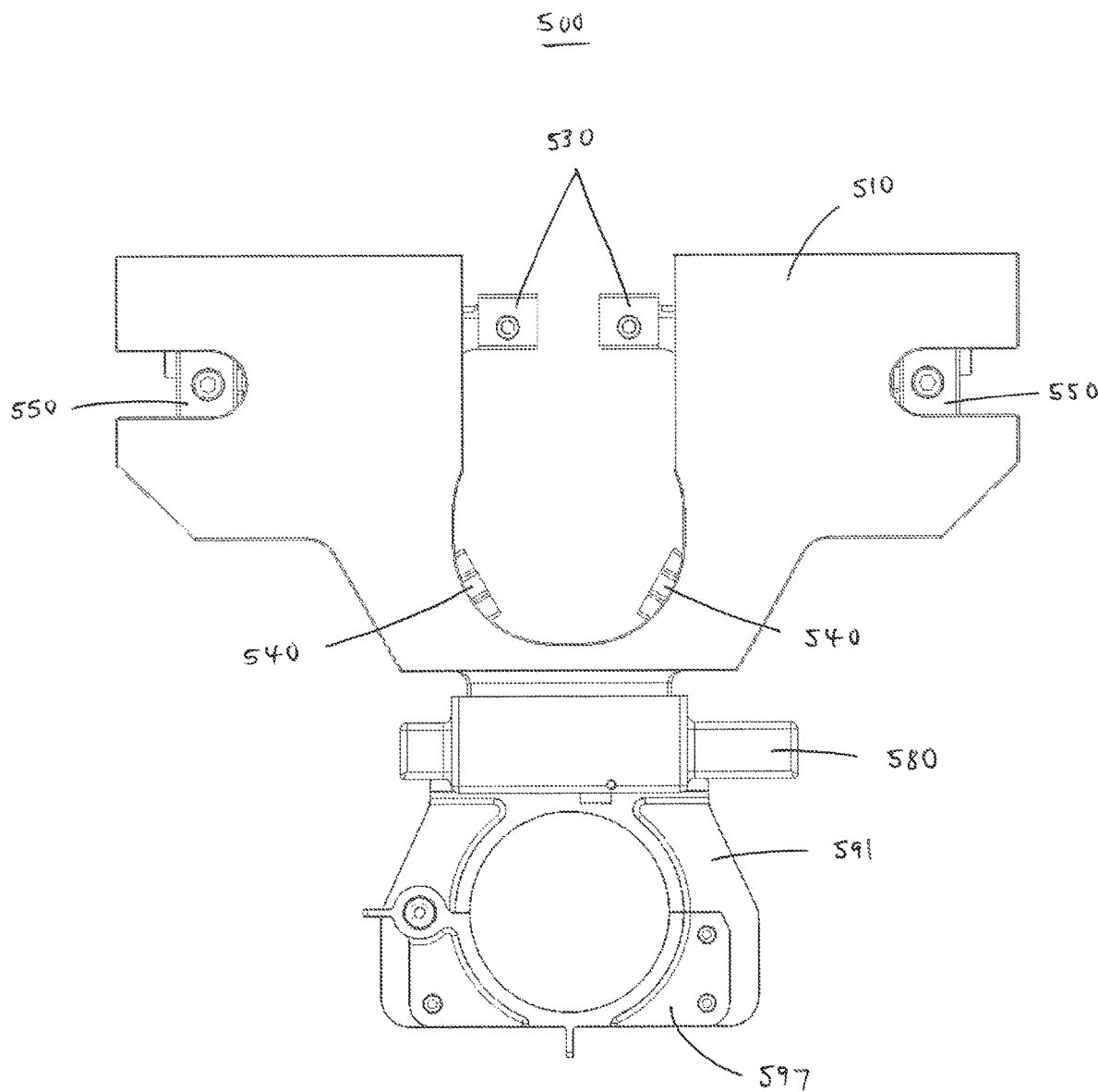
FIG. 11 is a plan view of the reinforcement assembly of FIG. 10.

FIG. 9 is a lower perspective view of the reinforcement assembly of FIG. 8 without the cooling pipe, the probe pipe, and the bracket. FIG. 10 is an upper perspective view of the reinforcement assembly of FIG. 9. FIG. 11 is a plan view of the reinforcement assembly of FIG. 10. Referring to FIGS. 9-11, the pair of pipe boss structures 540 of the reinforcement assembly 500 are configured to protrude inward from the base structure 510 and toward each other. For example, the pair of pipe boss structures 540 may be configured to move in a radial direction such that a travel axis of each of the pipe boss structures 540 coincides with a radius of the curvature defined by the base structure 510 for receiving the cooling pipe 300. Each of the pair of pipe boss structures 540 may have a slidable range of ±17.5 mm. As a result, each of the pair of pipe boss structures 540 may have a total slidable range of 35 mm.

Each of the pair of back boss structures 520 may have a slidable range of ±12.5 mm. As a result, each of the pair of back boss structures 520 may have a total slidable range of 25 mm. The travel axes of the back boss structures 520 may be coaxial, although example embodiments are not limited thereto.

Each of the pair of side clamps 550 may have a slidable range of ±12.5 mm. As a result, each of the pair of side clamps 550 may have a total slidable range of 25 mm. The travel axes of the side clamps 550 may also be coaxial, although example embodiments are not limited thereto.

Each of the pair of vertical clamps 560 may have a slidable range of ±8.5 mm. As a result, each of the pair of vertical clamps 560 may have a slidable range of 17 mm. The travel axes of the vertical clamps 560 may be parallel to each other, although example embodiments are not limited thereto.

Each of the pair of front clamps 570 may have a slidable range of ±12.5 mm. As a result, each of the pair of front clamps 570 may have a total slidable range of 25 mm. The travel axes of the front clamps 570 may also be parallel to each other, although example embodiments are not limited thereto.

Figure 12:
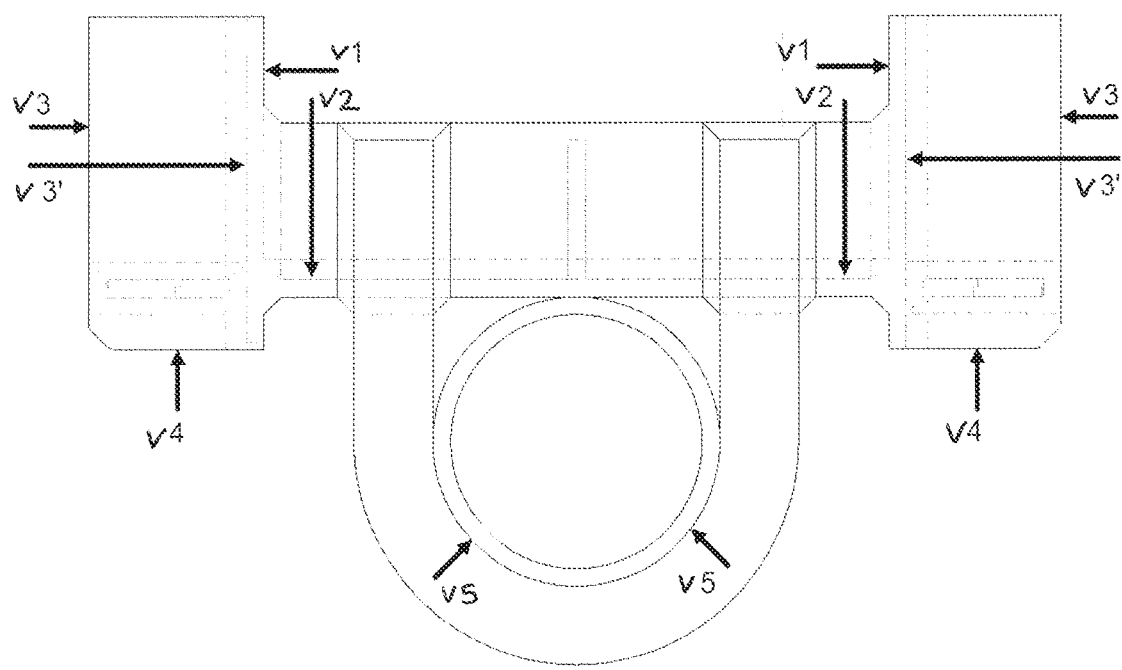
FIG. 12 is a diagram showing the vectors acting on the bracket and the cooling pipe by the reinforcement assembly of FIG. 11.

FIG. 12 is a diagram showing the vectors acting on the bracket and the cooling pipe by the reinforcement assembly of FIG. 11. In particular, it should be understood that the vectors shown in FIG. 12 are representative of the lateral constraints acting on the bracket 200 and the cooling pipe 300 by the reinforcement assembly 500. Vector V1 is applied by each of the back boss structures 520 of the reinforcement assembly 500 to the first side angle 220 and the second side angle 230 of the bracket 200. The back boss structures 520 also react against the spacers 530 such that vector V2 is applied by each of the spacers 530 to the center of gravity of the center angle 210, which is about 28.2 mm to 28.4 mm from the adjacent outer surfaces of the center angle 210. In an example embodiment, applying the load along the center of gravity can significantly reduce or even eliminate twisting of the center angle 210 (e.g., for extreme earthquake loads). However, as noted supra, the spacers 530 may be omitted if the swing gate is not included or not utilized to stabilize the probe 400. In the absence of spacers 530, a vector (e.g., V2') may still be applied by the reinforcement assembly 500 to portions of the center angle 210 where the U-bracket section 270 is attached.

Vector V3 is applied by each of the side clamps 550 of the reinforcement assembly 500 to the first side angle 220 and the second side angle 230 of the bracket 200. Optionally, the dimensions of the vertical clamps 560 may be increased (e.g., modified to each have an extended "nose" which also contacts the side surface of the vertical portion of the corresponding side angle) such that vector V3' is applied by each of the vertical clamps 560 to the center of gravity of the corresponding side angle, which is about 28.2 mm to 28.4 mm from the adjacent surfaces of each of the first side angle 220 and the second side angle 230. In an example embodiment, applying the load along the center of gravity of each of the first side angle 220 and the second side angle 230 can significantly reduce or even eliminate twisting (e.g., for extreme earthquake loads).

Vector V4 is applied by each of the front clamps 570 of the reinforcement assembly 500 to the first side angle 220 and the second side angle 230 of the bracket 200. Vector V5 is applied by each of the pipe boss structures 540 of the reinforcement assembly 500 to the cooling pipe 300. In an example embodiment, if the center angle 210 is regarded as constraining the cooling pipe 300 at a 12 o'clock position, then the pipe boss structures 540 can be regarded as constraining the cooling pipe 300 at the 4 o'clock and 8 o'clock positions.

Figure 13:
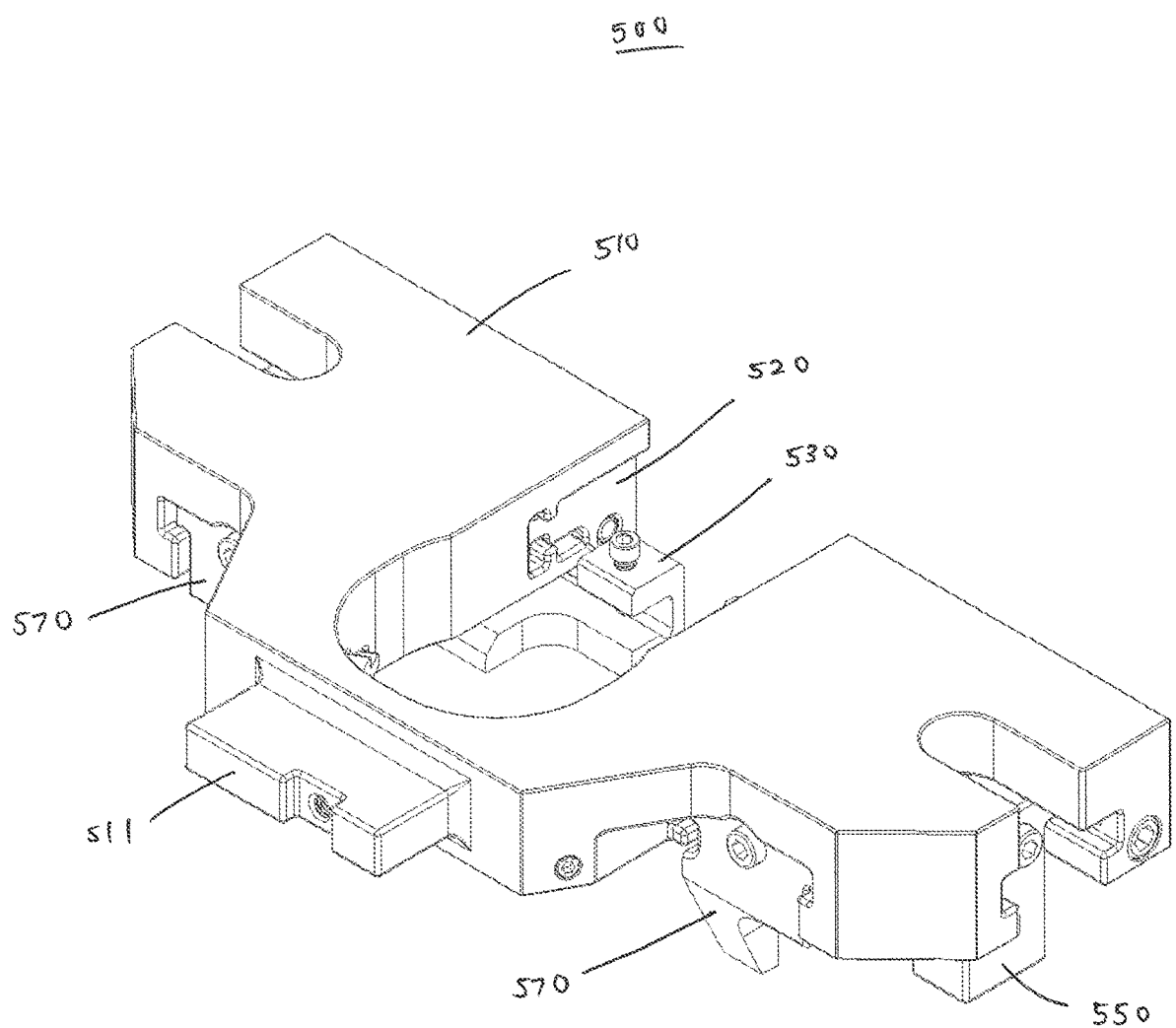
FIG. 13 is an upper perspective view of the reinforcement assembly of FIG. 11 without the linkage structure and the swing gate.
Figure 14:
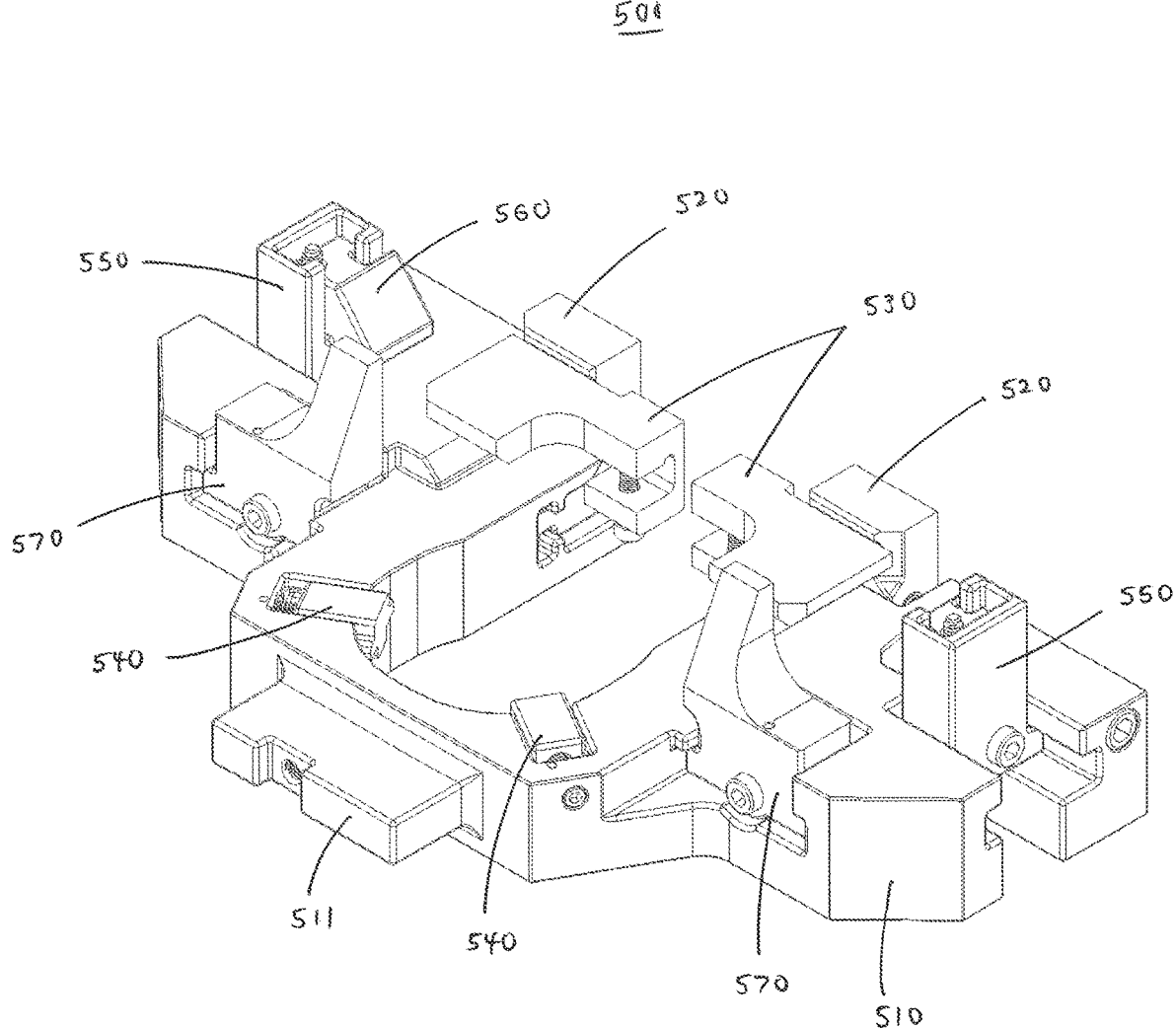
FIG. 14 is a lower perspective view of the reinforcement assembly of FIG. 13.

FIG. 13 is an upper perspective view of the reinforcement assembly of FIG. 11 without the linkage structure and the swing gate. FIG. 14 is a lower perspective view of the reinforcement assembly of FIG. 13. Referring to FIGS. 13-14, the base structure 510 of the reinforcement assembly 500 includes a protruding portion 511 configured to engage with the linkage structure 580 which, in turn, is configured to engage with the swing gate if stabilization of the probe 400 is desired.

Figure 15:
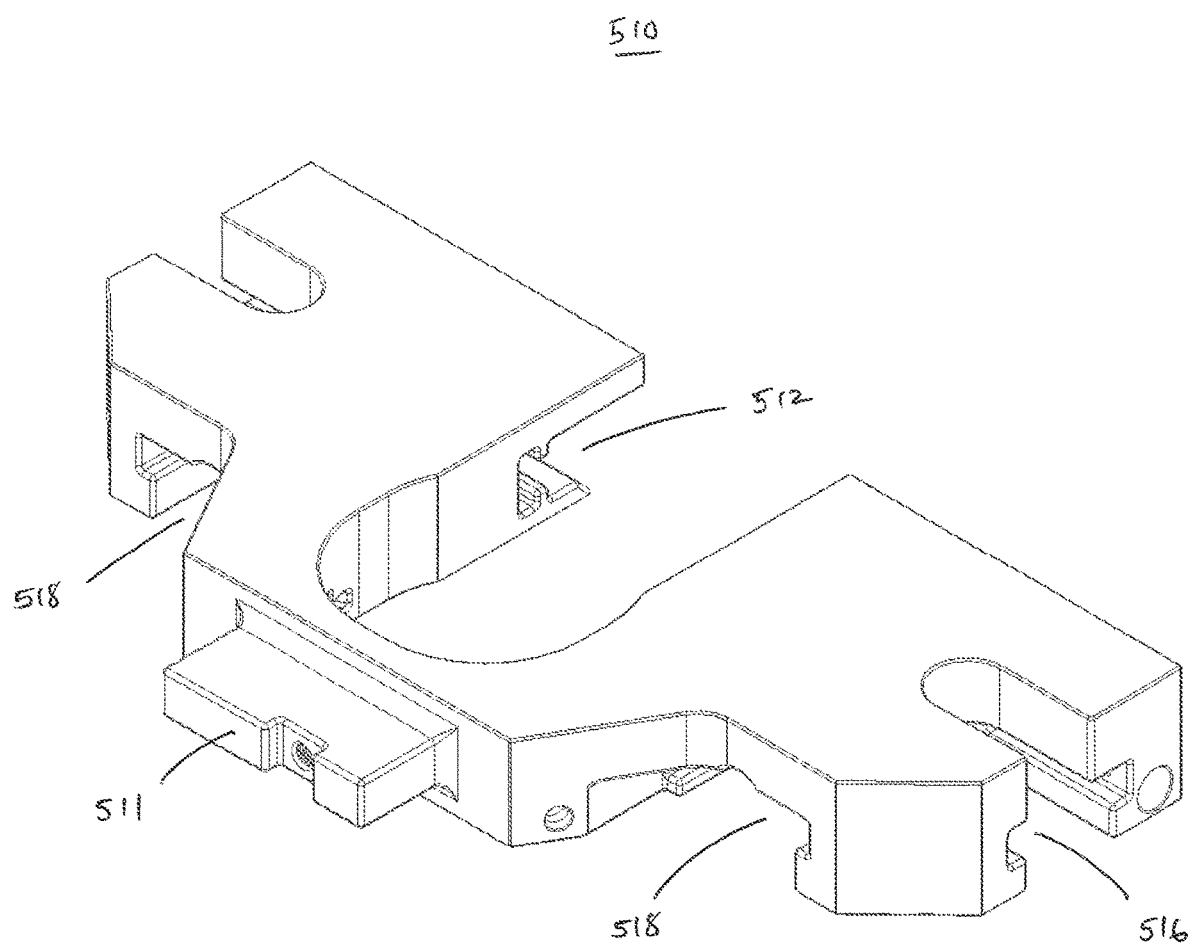
FIG. 15 is an upper perspective view of the base structure of the reinforcement assembly of FIG. 13.
Figure 16:
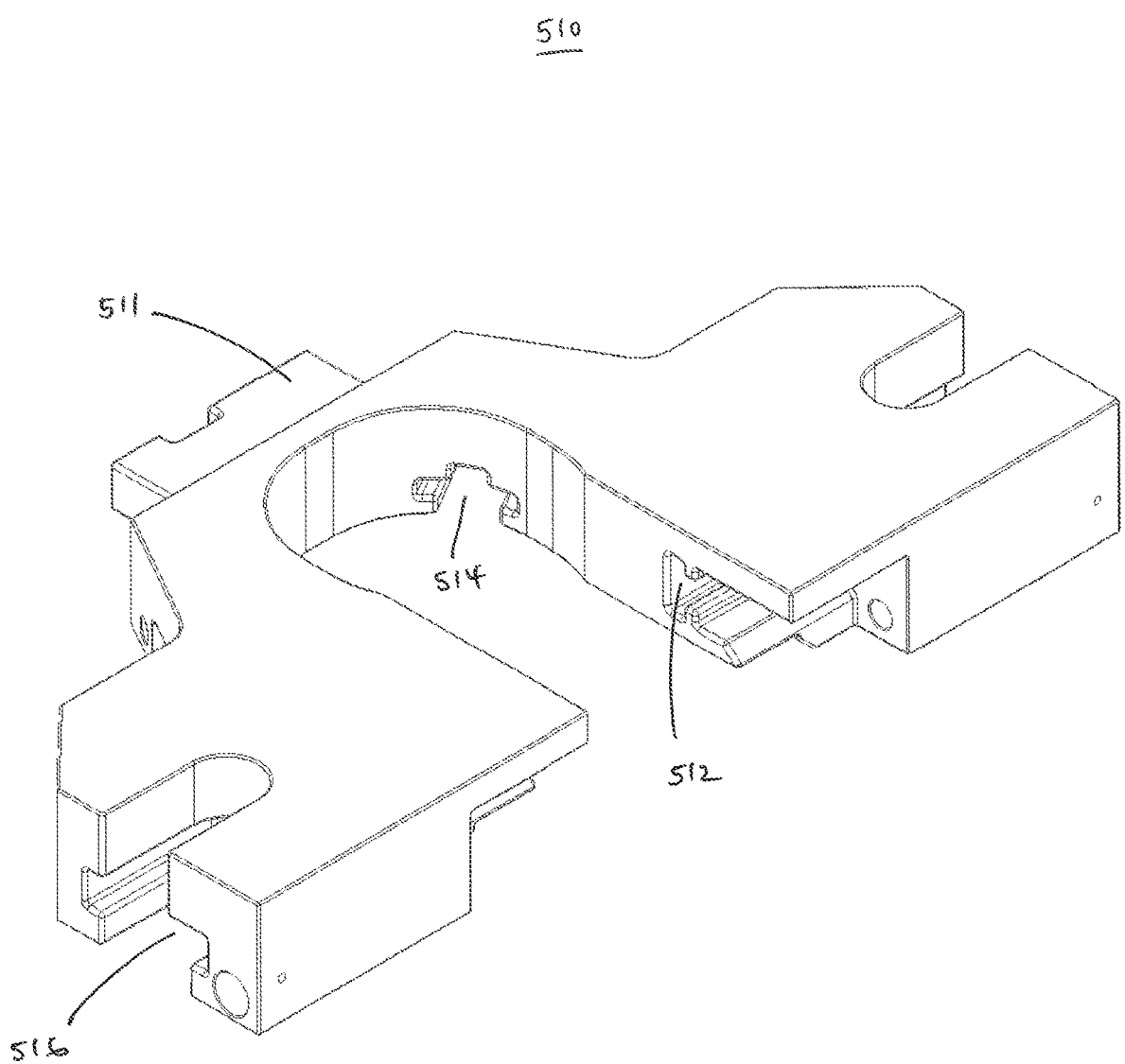
FIG. 16 is another upper perspective view of the base structure of FIG. 15.
Figure 17:
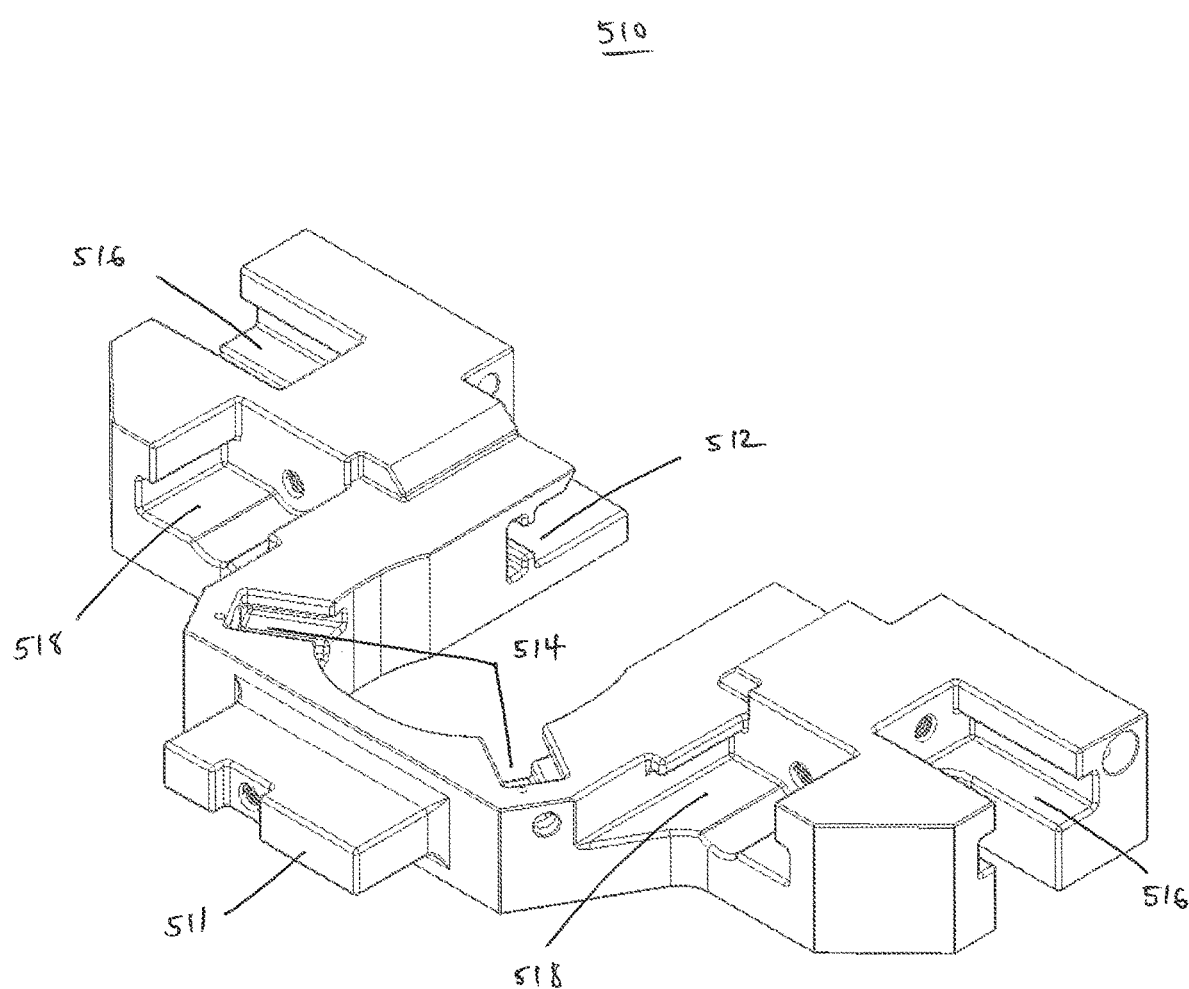
FIG. 17 is a lower perspective view of the base structure of FIG. 15.
Figure 18:
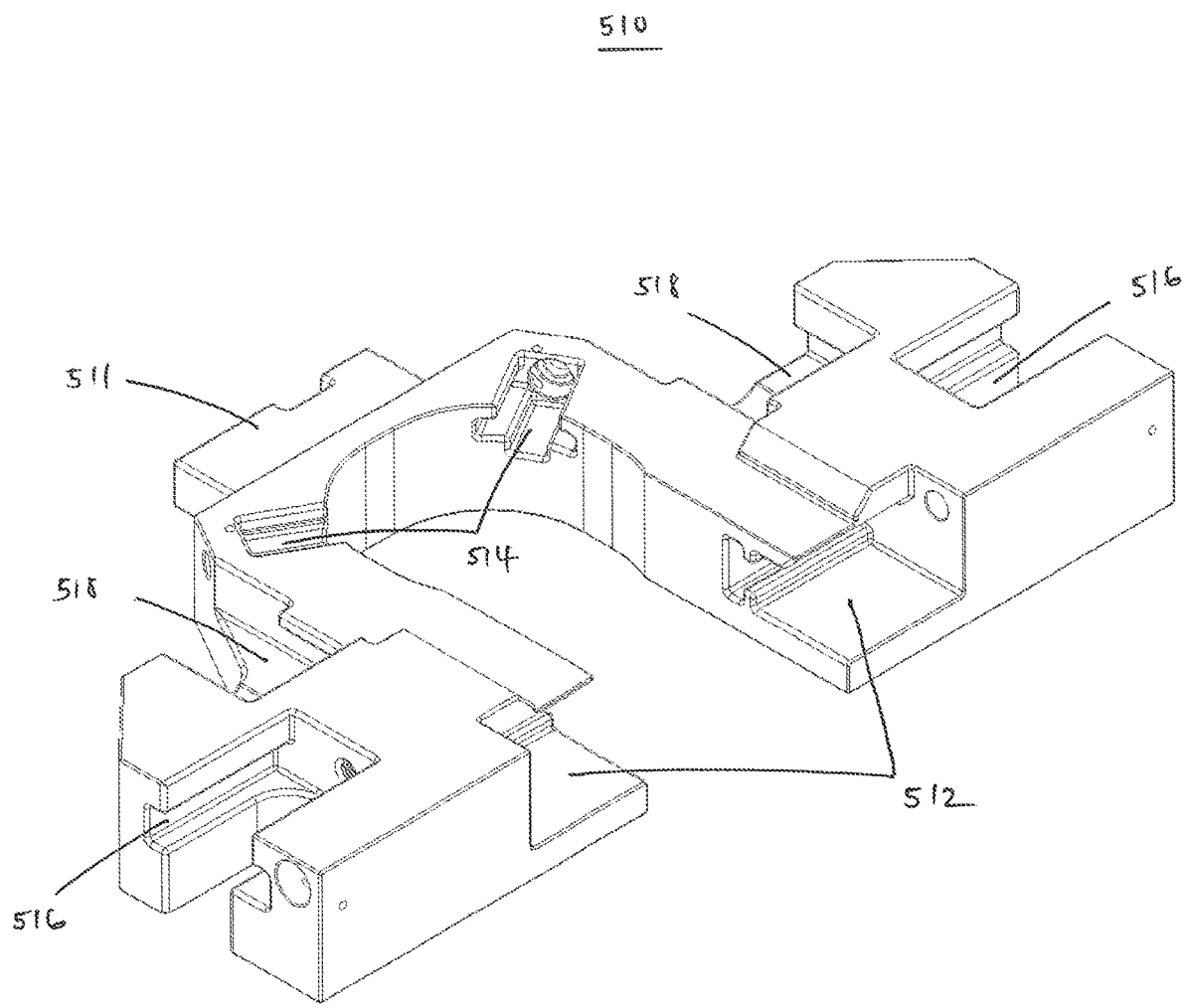
FIG. 18 is another lower perspective view of the base structure of FIG. 17.
Figure 19:
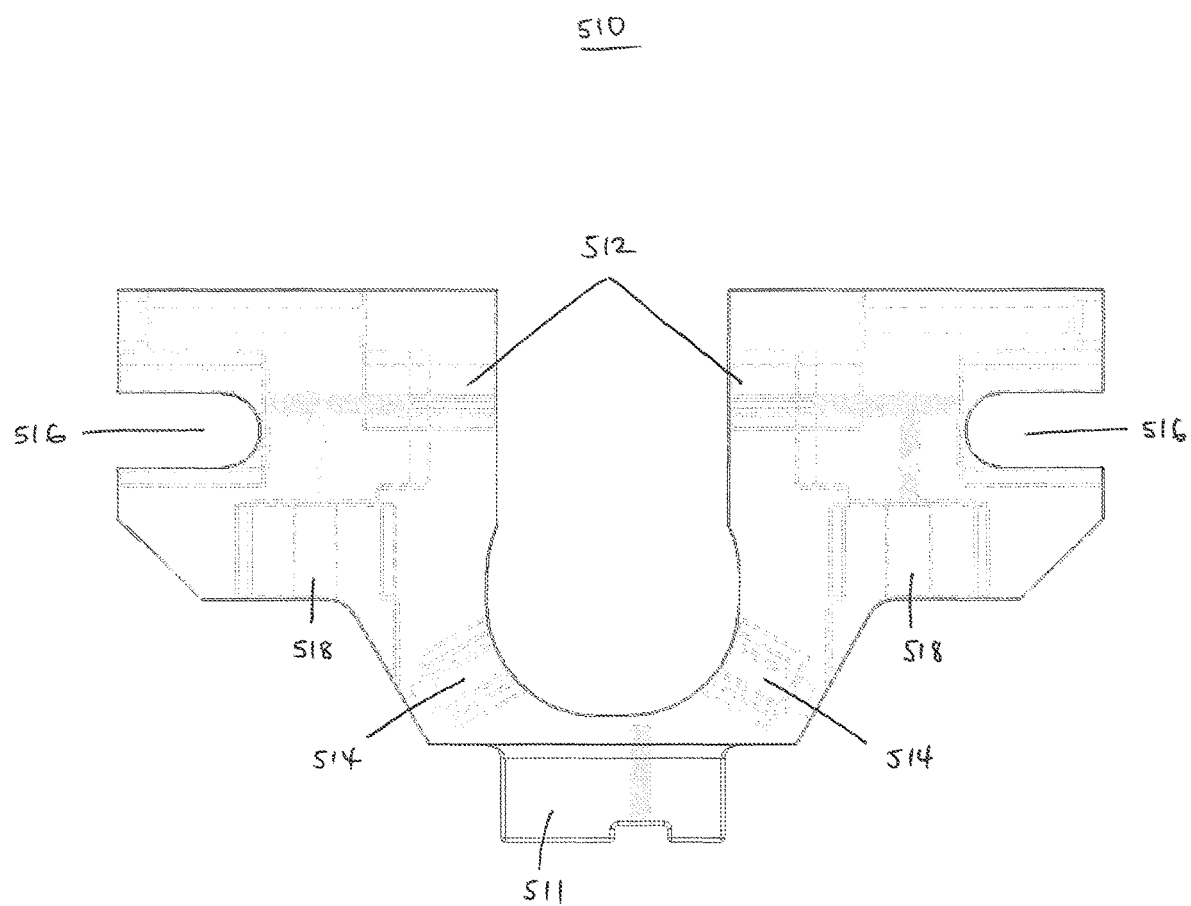
FIG. 19 is a plan view of the base structure of FIG. 15 with hidden lines corresponding to the slots and bolt holes defined therein.

FIG. 15 is an upper perspective view of the base structure of the reinforcement assembly of FIG. 13. FIG. 16 is another upper perspective view of the base structure of FIG. 15. FIG. 17 is a lower perspective view of the base structure of FIG. 15. FIG. 18 is another lower perspective view of the base structure of FIG. 17. FIG. 19 is a plan view of the base structure of FIG. 15 with hidden lines corresponding to the slots and bolt holes defined therein. Referring to FIGS. 15-19, the base structure 510 defines a pair of back slots 512, a pair of angled slots 514, a pair of side slots 516, and a pair of front slots 518. One or more of the back slots 512, the angled slots 514, the side slots 516, and the front slots 518 may include a portion in a form of a T-slot, although example embodiments are not limited thereto. Alternatively, one or more of the back slots 512, the angled slots 514, the side slots 516, and the front slots 518 may include a portion in a form of a dovetail slot.

Back boss structures 520 are configured to slidably engage with the back slots 512. Pipe boss structures 540 are configured to slidably engage with the angled slots 514. Side clamps 550 are configured to slidably engage with the side slots 516. Front clamps 570 are configured to slidably engage with the front slots 518. One or more of the back boss structures 520, the pipe boss structures 540, the side clamps 550, and the front clamps 570 may include a portion in a form of a T-slide, although example embodiments are not limited thereto. Alternatively, one or more of the back boss structures 520, the pipe boss structures 540, the side clamps 550, and the front clamps 570 may include a portion in a form of a dovetail slide.

The base structure 510 is configured to cover the bracket 200 as part of the installation of the reinforcement assembly 500. In an example embodiment, the base structure 510 is a monolithic component.

Figure 20:
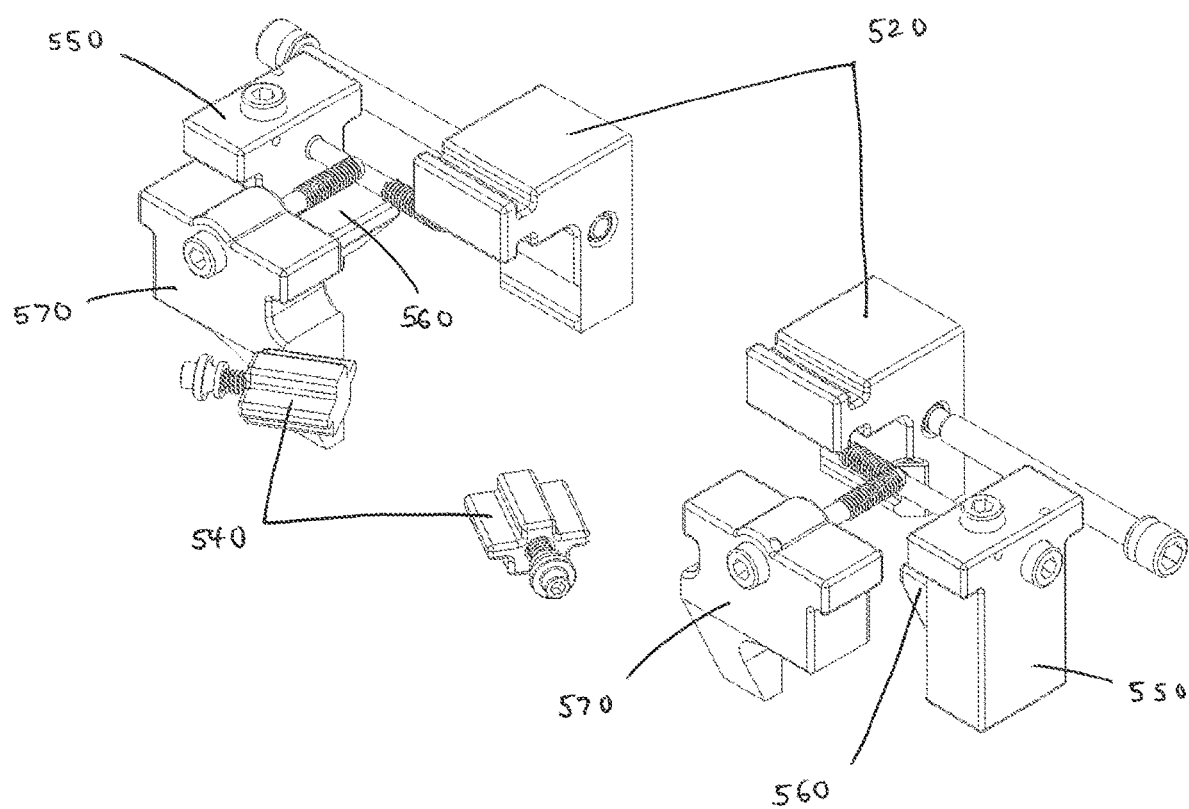
FIG. 20 is a perspective view of components of the reinforcement assembly of FIG. 13 without the base structure and the spacers.

FIG. 20 is a perspective view of components of the reinforcement assembly of FIG. 13 without the base structure and the spacers. Referring to FIG. 20, the back boss structures 520, the pipe boss structures 540, the side clamps 550, the vertical clamps 560, and the front clamps 570 are shown along with the bolts used to secure these components to the base structure 510. In addition, positions of the back boss structures 520, the pipe boss structures 540, the side clamps 550, the vertical clamps 560, and the front clamps 570 relative to the base structure 510 may be adjusted by turning the corresponding bolt(s) (e.g., via torque tools positioned remotely by hand poles).

Figure 21:
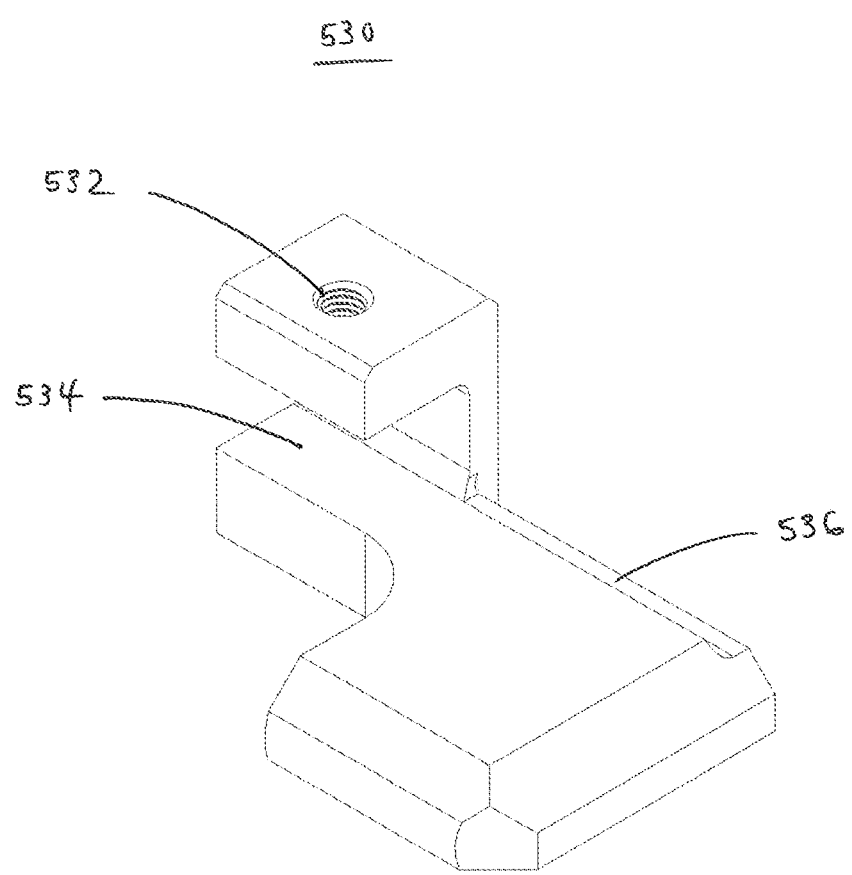
FIG. 21 is a perspective view of a spacer of the reinforcement assembly of FIG. 13.
Figure 22:
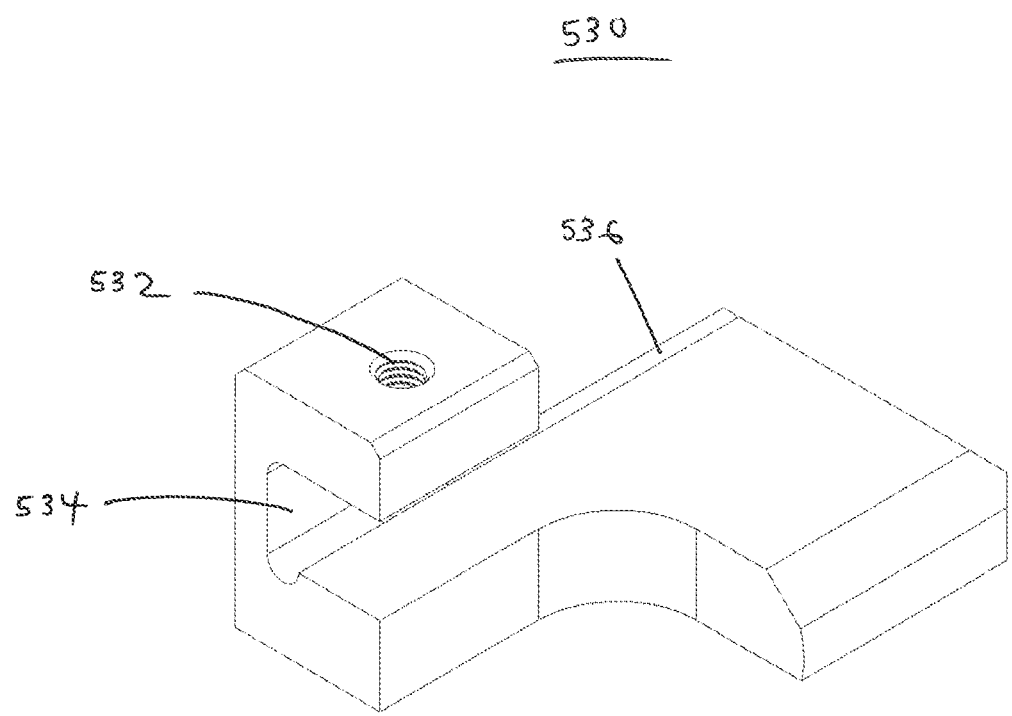
FIG. 22 is another perspective view of the spacer of FIG. 21.

FIG. 21 is a perspective view of a spacer of the reinforcement assembly of FIG. 13. FIG. 22 is another perspective view of the spacer of FIG. 21. Referring to FIGS. 21-22, the spacer 530 includes a bolt hole 532, a notch 534, and an indented portion 536. As noted supra, the spacer 530 is optional and may be utilized when the probe 400 is being stabilized by the reinforcement assembly 500. When utilized, the spacer 530 is configured to engage with the bracket 200 via the notch 534 and to engage with a back boss structure 520 via the indented portion 536. In particular, the spacer 530 is configured to be pressed against the center angle 210 of the bracket 200 by a back boss structure 520 of the reinforcement assembly 500 and secured with a bolt via the bolt hole 532. The spacer 530 is configured to allow for centroid loading through a center of rotation of a local cross-section of the bracket 200 to reduce torsional shear stress. As shown in the previously-discussed drawings (e.g., FIG. 9), the spacer 530 may be provided in a form of two spacers, wherein one is a mirror image of the other.

Figure 23:
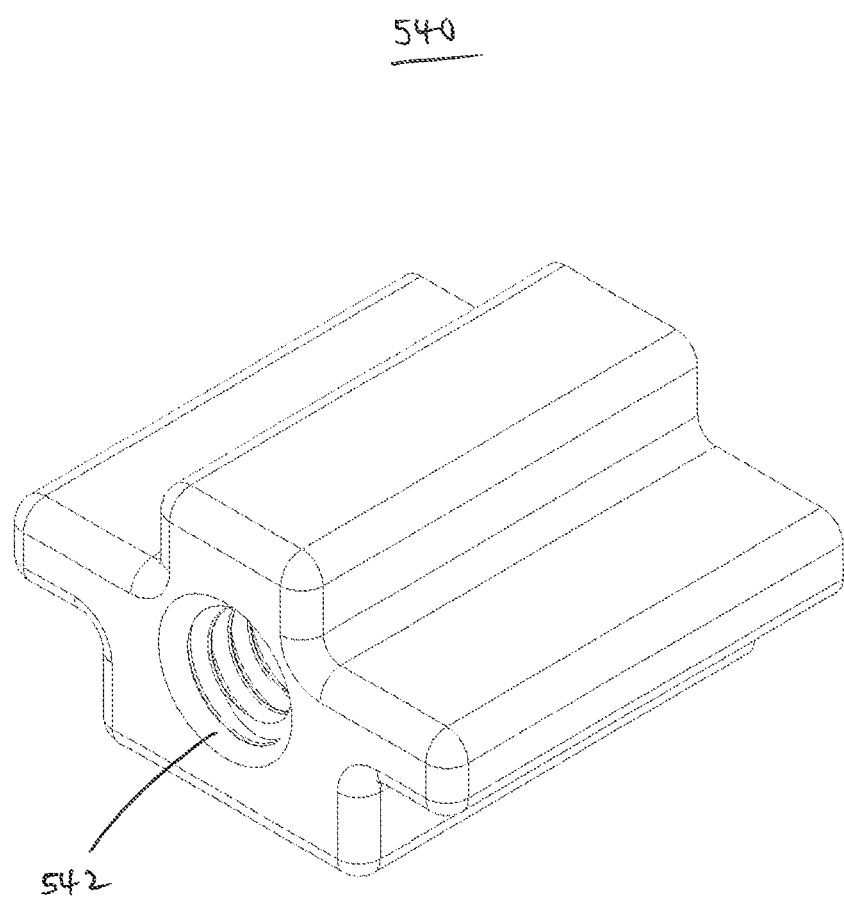
FIG. 23 is a perspective view of a pipe boss structure of the components of the reinforcement assembly of FIG. 20.

FIG. 23 is a perspective view of a pipe boss structure of the components of the reinforcement assembly of FIG. 20. Referring to FIG. 23, the pipe boss structure 540 includes a bolt hole 542 configured to receive a bolt that allows the pipe boss structure 540 to be positioned and adjusted relative to the base structure 510 of the reinforcement assembly 500. Because the bolt hole 542 is threaded and extends through a longitudinal axis of the pipe boss structure 540, the engagement with a threaded bolt and the turning of such a bolt allows the pipe boss structure 540 to be incrementally protracted and retracted from the angled slot 514 of the base structure 510 by turning the bolt.

Figure 24:
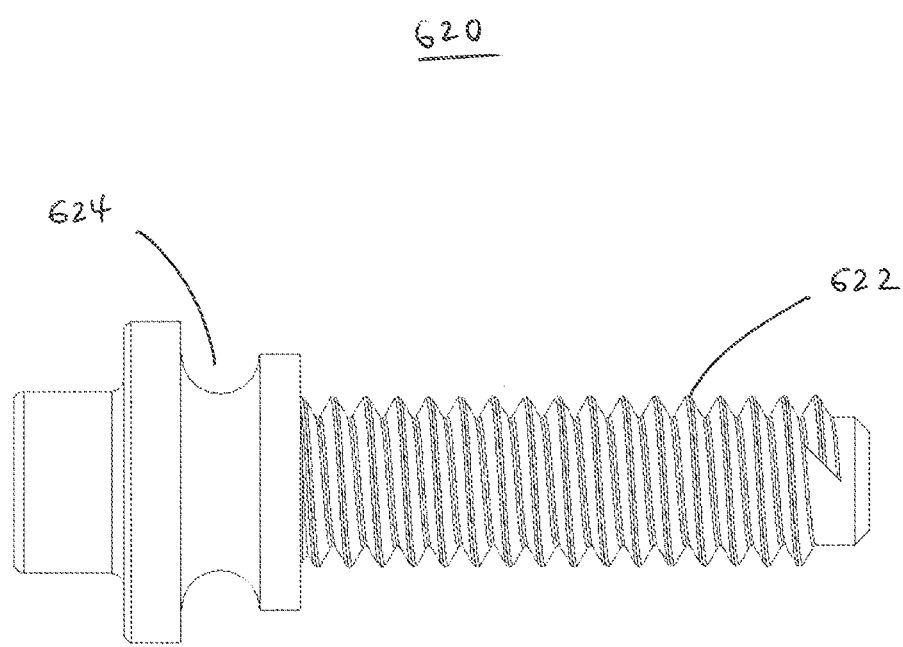
FIG. 24 is a side view of a bolt of the components of the reinforcement assembly of FIG. 20.

FIG. 24 is a side view of a bolt of the components of the reinforcement assembly of FIG. 20. Referring to FIG. 24, the bolt 620 includes a head portion and a threaded portion 622. The head portion of the bolt 620 defines a groove 624 configured to receive a pin for preventing the bolt 620 from becoming disengaged from a bolt hole (e.g., due to vibrations). In an example embodiment, the bolt 620 may engage the pipe boss structure 540 via the bolt hole 542 so as to secure the pipe boss structure 540 within an angled slot 514 of the base structure 510 of the reinforcement assembly 500. The position of the pipe boss structure 540 (e.g., degree of protraction/retraction relative to the angled slot 514) may be adjusted by turning the bolt 620.

Figure 25:
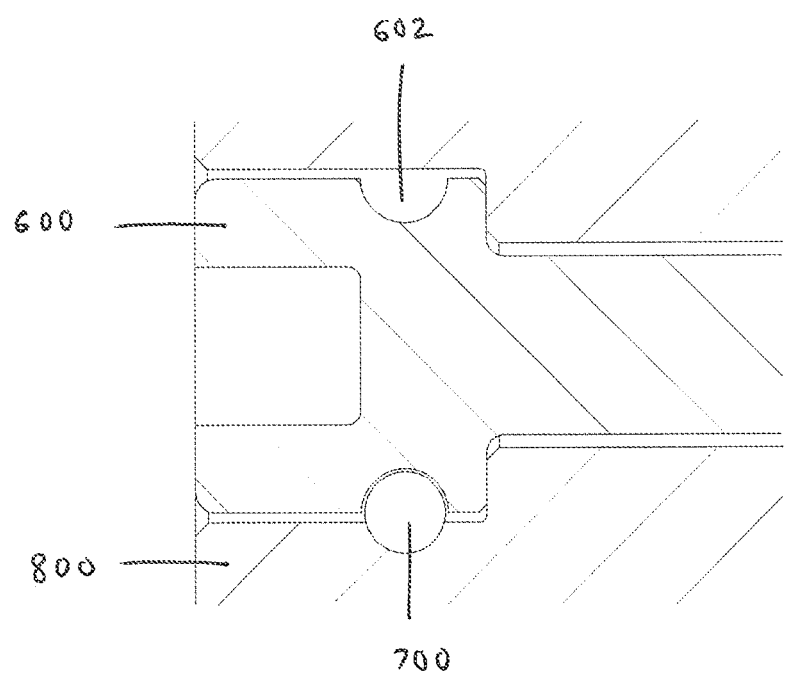
FIG. 25 is a cross-sectional view of an arrangement for retaining a bolt with a pin according to an example embodiment.

FIG. 25 is a cross-sectional view of an arrangement for retaining a bolt with a pin according to an example embodiment. Referring to FIG. 25, a component 800 defines a bolt hole and a pin hole. The pin hole is orthogonal to and overlaps with the bolt hole. A bolt 600 is engaged with the bolt hole defined by the component 800. The head portion of the bolt 600 defines a groove 602. The pin hole of the component 800 is configured to coincide with the groove 602 of the bolt 600 when the bolt 600 is engaged with the component 800. As a result, a pin 700 can be inserted (e.g., via interference fit, press fit, or friction fit) within the pin hole to retain the bolt 600. Because of the groove 602, the bolt 600 can still be turned without becoming disengaged from the component 800. The component 800 may be one or more of the components of the reinforcement assembly 500.

Figure 26:
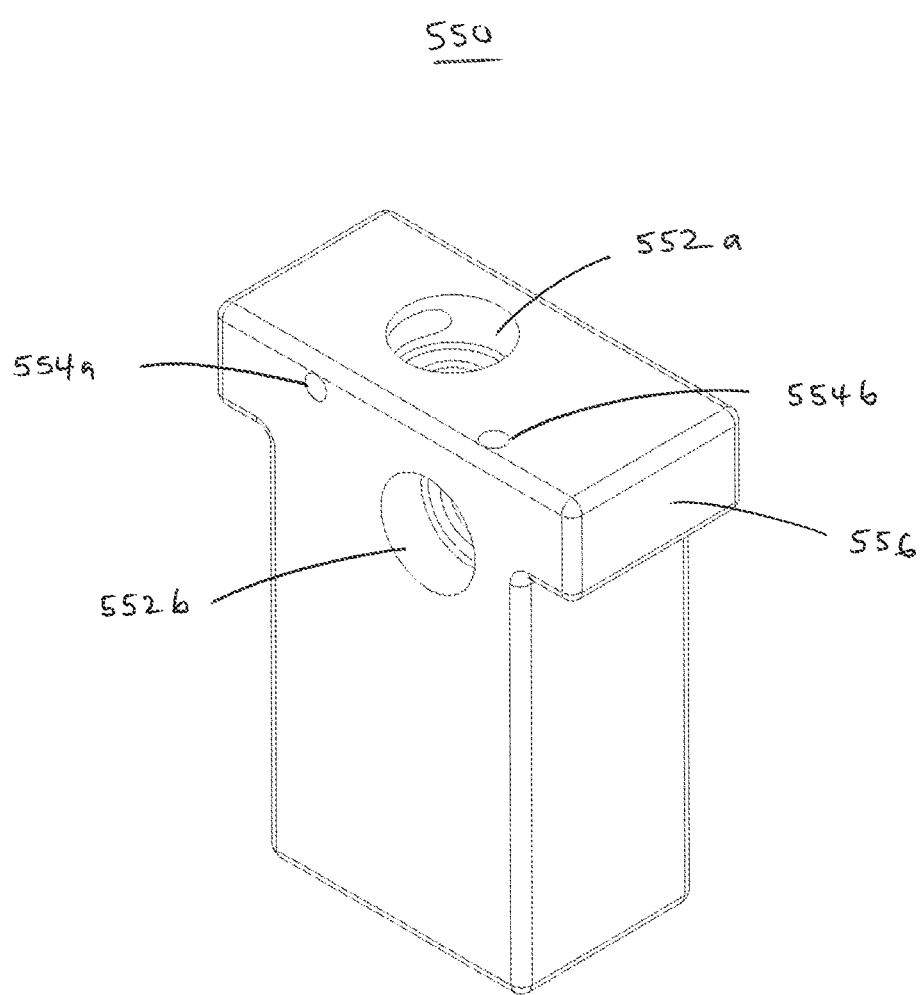
FIG. 26 is a perspective view of a side clamp of the components of the reinforcement assembly of FIG. 20.

FIG. 26 is a perspective view of a side clamp of the components of the reinforcement assembly of FIG. 20. Referring to FIG. 26, the side clamp 550 includes an upper portion in a form of a T-slide 556. The T-slide 556 is configured to slidably engage with the side slot 516 of the base structure 510. The side clamp 550 defines a bolt hole 552a extending axially through the side clamp 550 and a bolt hole 552b extending laterally through the side clamp 550. In addition, the side clamp 550 defines a pin hole 554a extending orthogonally to (e.g., horizontally) and overlapping the bolt hole 552a. The side clamp 550 also defines a pin hole 554b extending orthogonally to (e.g., vertically) and overlapping the bolt hole 552b.

Figure 27:
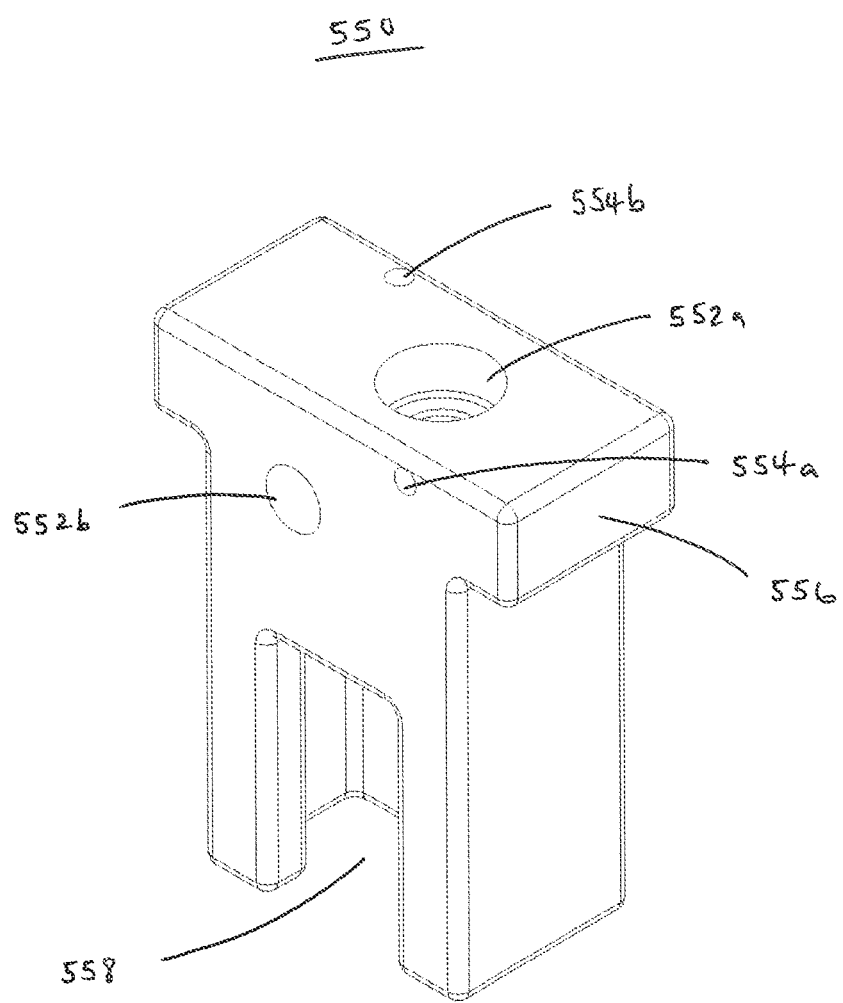
FIG. 27 is another perspective view of the side clamp of FIG. 26.

FIG. 27 is another perspective view of the side clamp of FIG. 26. Referring to FIG. 27, the side clamp 550 defines a vertical slot 558 configured to receive a vertical clamp 560. The vertical slot 558 is in a form of a T-slot, although example embodiments are not limited thereto. For instance, alternatively, the vertical slot 558 may be in a form of a dovetail slot.

Figure 28:
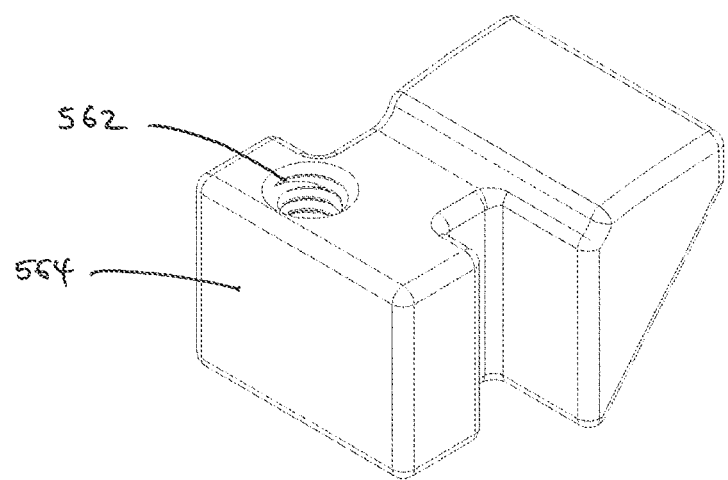
FIG. 28 is a perspective view of a vertical clamp of the components of the reinforcement assembly of FIG. 20.
Figure 29:
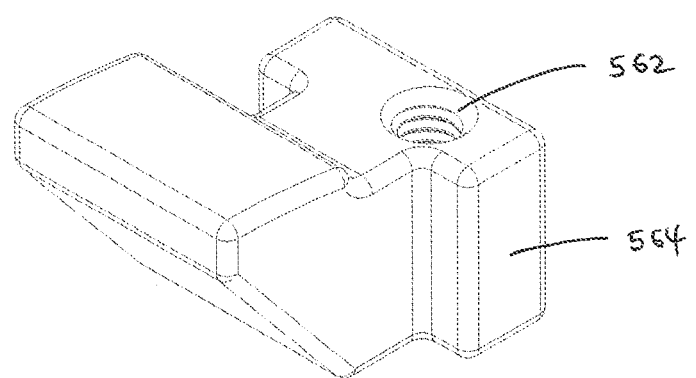
FIG. 29 is another perspective view of the vertical clamp of FIG. 28.
Figure 30:
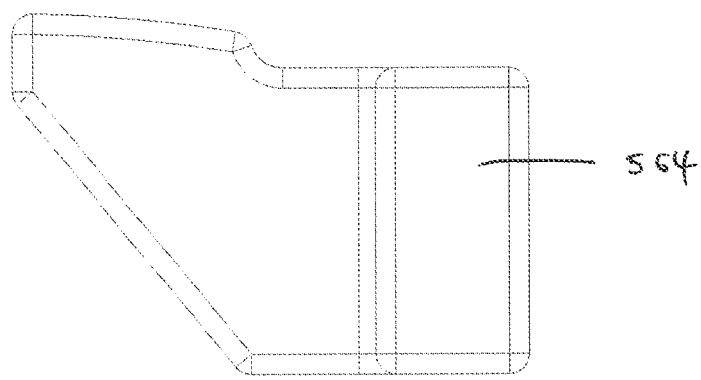
FIG. 30 is a side view of the vertical clamp of FIG. 29.

FIG. 28 is a perspective view of a vertical clamp of the components of the reinforcement assembly of FIG. 20. FIG. 29 is another perspective view of the vertical clamp of FIG. 28. FIG. 30 is a side view of the vertical clamp of FIG. 29. Referring to FIGS. 28-30, the vertical clamp 560 is configured to slidably engage with the vertical slot 558 of the side clamp 550. The vertical clamp 560 includes an end portion in a form of a T-slide 564, although example embodiments are not limited thereto. For instance, alternatively, the vertical clamp 560 may include an end portion in a form of a dovetail slide.

The vertical clamp 560 defines a bolt hole 562 configured to receive a bolt that allows the vertical clamp 560 to be positioned and adjusted relative to the side clamp 550 and the base structure 510 of the reinforcement assembly 500. Because the bolt hole 562 is threaded, the engagement with a threaded bolt and the turning of such a bolt allows the vertical clamp 560 to be incrementally raised and lowered within the vertical slot 558 of the side clamp 550 by turning the bolt. The upper surface of the vertical clamp 560 that will contact an undersurface of the horizontal portion of the side angle (e.g., first side angle 220, second side angle 230) is curved.

Figure 31:
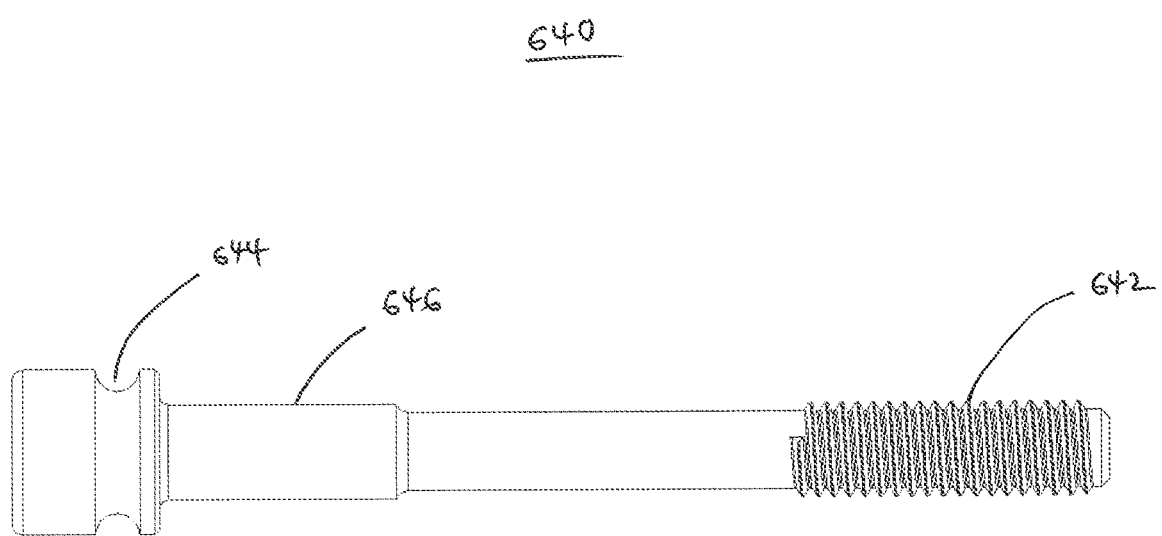
FIG. 31 is a side view of another bolt of the components of the reinforcement assembly of FIG. 20.

FIG. 31 is a side view of another bolt of the components of the reinforcement assembly of FIG. 20. Referring to FIG. 31, the bolt 640 includes a head portion, a shank, and a threaded portion 642. The head portion of the bolt 640 defines a groove 644 configured to receive a pin for preventing the bolt 640 from becoming disengaged from a bolt hole (e.g., due to vibrations). In an example embodiment, the bolt 640 may engage the side clamp 550 via the bolt hole 552*b* so as to secure the side clamp 550 within a side slot 516 of the base structure 510 of the reinforcement assembly 500. The position of the side clamp 550 within the side slot 516 may be adjusted by turning the bolt 640.

The shank of the bolt 640 includes a stepped portion 646. The length of the stepped portion 646 may vary depending on the dimension of the component through which the bolt 640 extends. For example, if the bolt 640 is intended for use with a side clamp 550, then the stepped portion 646 may have a length that ends at approximately the opposite side face of the side clamp 550 when the bolt 640 is fully inserted. As result, the bolt 640 can be turned to move the side clamp 550 all the way into the side slot 516 (via the engagement of the threaded portion 642 with the corresponding bolt hole of the base structure 510) such that the side clamp 550 is essentially against an end wall of the side slot 516.

Figure 32:
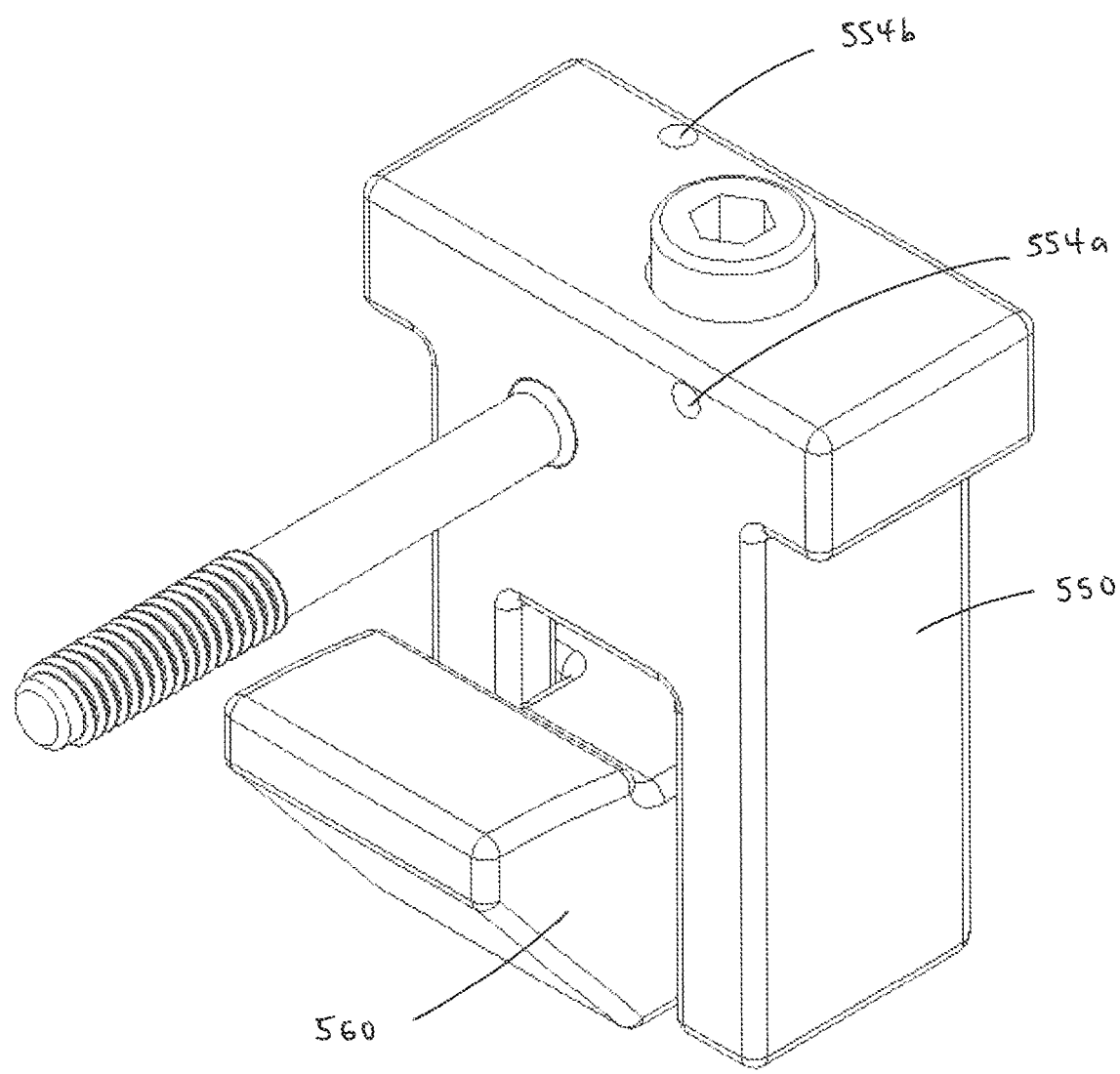
FIG. 32 is a perspective view of a side clamp, vertical clamp, and corresponding bolts arrangement of the components of the reinforcement assembly FIG. 20.

FIG. 32 is a perspective view of a side clamp, vertical clamp, and corresponding bolts arrangement of the components of the reinforcement assembly FIG. 20. Referring to FIG. 32, a vertical clamp 560 is slidably engaged with the vertical slot 558 of a side clamp 550 and secured with a bolt (e.g., bolt 640) extending axially through the top of the side clamp 550. In an example embodiment, the bolt hole through the top of the side clamp 550 is not threaded, while the bolt hole 562 of the vertical clamp 560 is threaded. The threaded portion of the axial bolt is engaged with the bolt hole 562 of the vertical clamp 560. As a result, turning the axial bolt in a first direction causes the vertical clamp 560 to move upward within the vertical slot 558 of the side clamp 550. Conversely, turning the axial bolt in an opposite second direction causes the vertical clamp 560 to move downward within the vertical slot 558 of the side clamp 550.

In addition, a bolt (e.g., bolt 640) extends laterally through the side of the side clamp 550. The lateral bolt is configured to secure the side clamp 550 (and, consequently, the vertical clamp 560 engaged with the side clamp 550) to the base structure 510 of the reinforcement assembly 500. In an example embodiment, the bolt hole through the side of the side clamp 550 is not threaded, while the corresponding bolt hole in the base structure 510 is threaded. The threaded portion of the lateral bolt is engaged with the corresponding bolt hole in the base structure 510. As a result, turning the lateral bolt in a first direction causes the side clamp 550 to move inward within the side slot 516 of the base structure 510. Conversely, turning the lateral bolt in an opposite second direction causes the side clamp 550 to move outward within the side slot 516 of the base structure 510.

Furthermore, the side clamp 550 defines a pin hole 554*a* that is orthogonal to and overlaps with the bolt hole through the top of the side clamp 550. An axial bolt (e.g., bolt 640) is engaged with the top bolt hole defined by the side clamp 550. The head portion of the axial bolt defines a groove (e.g., groove 644). The pin hole 554*a* is configured to coincide with the groove of the axial bolt when the axial bolt is engaged with the side clamp 550. As a result, a pin can be inserted (e.g., via interference fit, press fit, or friction fit) within the pin hole 554*a* to retain the axial bolt. Because of the groove, the axial bolt can be turned to move the vertical clamp 560 within the vertical slot 558 without becoming disengaged from the base structure 510.

Similarly, the side clamp 550 defines a pin hole 554*b* that is orthogonal to and overlaps with the bolt hole through the side of the side clamp 550. A lateral bolt (e.g., bolt 640) is engaged with the side bolt hole defined by the side clamp 550. The head portion of the lateral bolt defines a groove (e.g., groove 644). The pin hole 554*b* is configured to coincide with the groove of the lateral bolt when the lateral bolt is engaged with the side clamp 550. As a result, a pin can be inserted (e.g., via interference fit, press fit, or friction fit) within the pin hole 554*b* to retain the lateral bolt. Because of the groove, the lateral bolt can be turned to move the side clamp 550 within the side slot 516 without becoming disengaged from the base structure 510.

Figure 33:
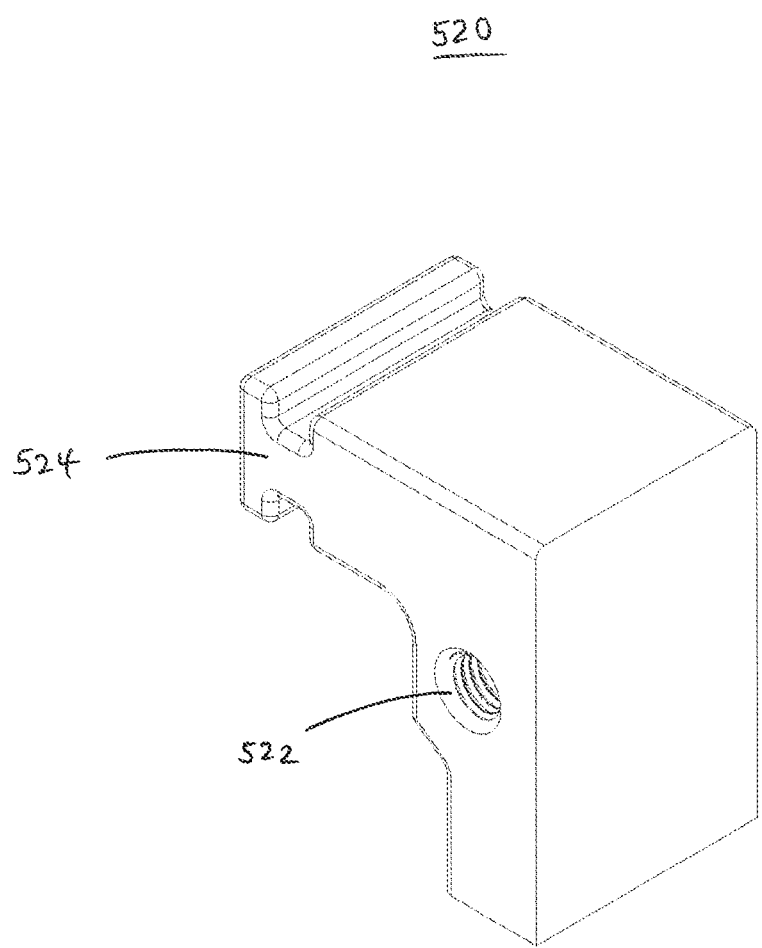
FIG. 33 is a perspective view of a back boss structure of the components of the reinforcement assembly FIG. 20.
Figure 34:
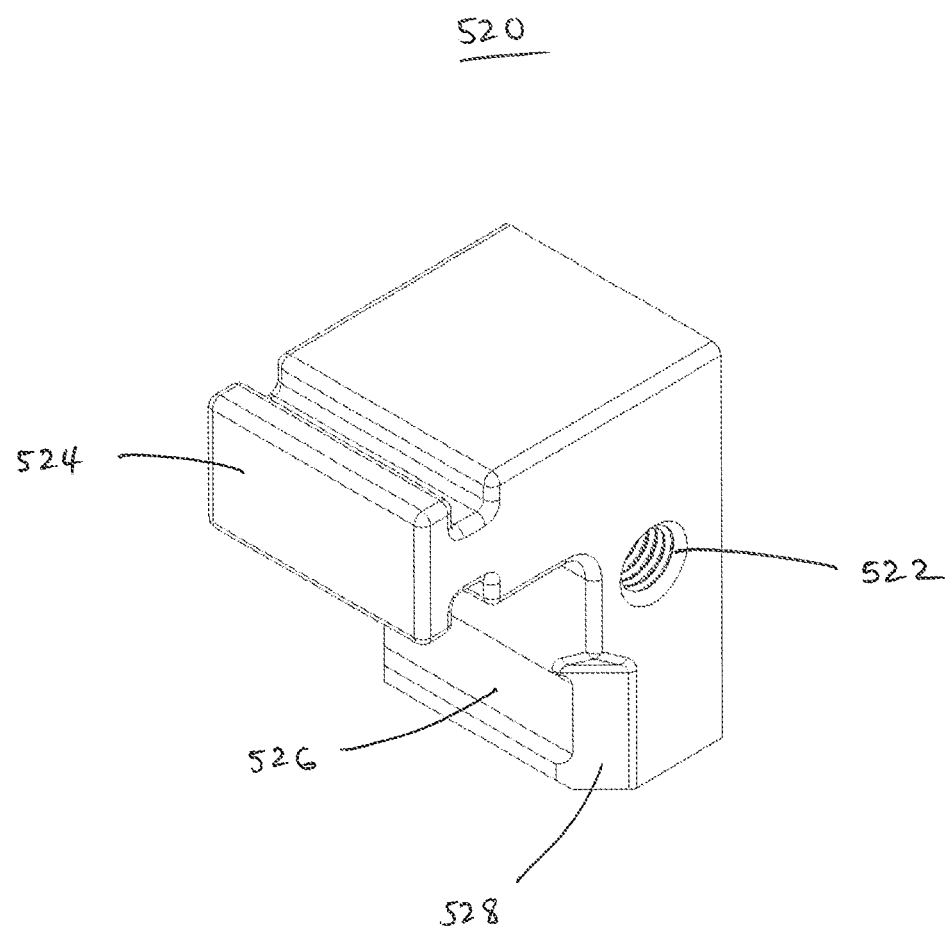
FIG. 34 is another perspective view of the back boss structure of FIG. 33.
Figure 35:
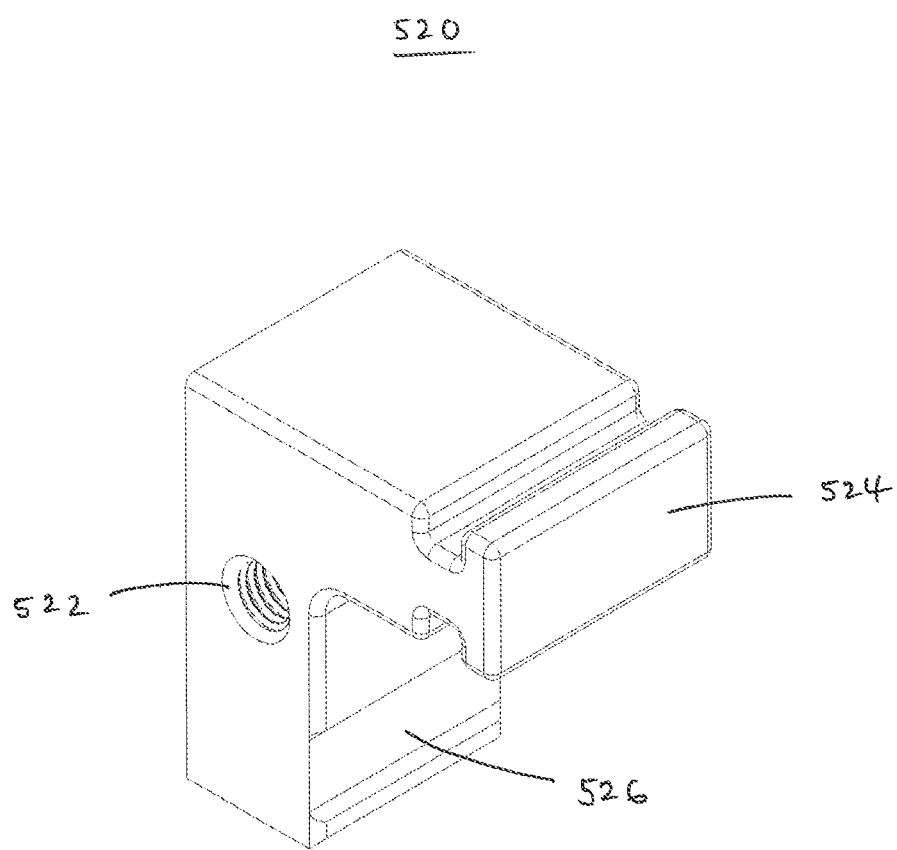
FIG. 35 is another perspective view of the back boss structure of FIG. 34.
Figure 36:
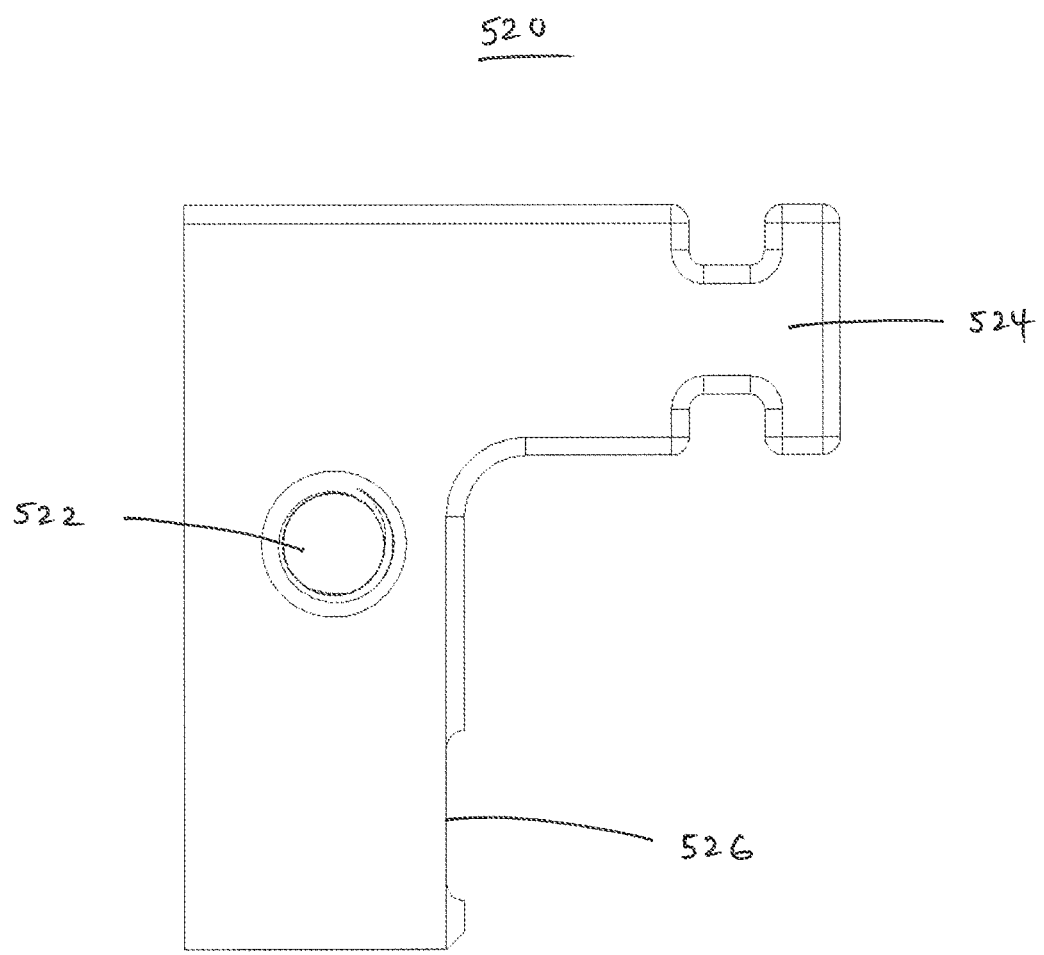
FIG. 36 is a side view of the back boss structure of FIG. 35.

FIG. 33 is a perspective view of a back boss structure of the components of the reinforcement assembly FIG. 20. FIG. 34 is another perspective view of the back boss structure of FIG. 33. FIG. 35 is another perspective view of the back boss structure of FIG. 34. FIG. 36 is a side view of the back boss structure of FIG. 35. Referring to FIGS. 33-36, the back boss structure 520 is configured to slidably engage with a back slot 512 of the base structure 510. The back boss structure 520 includes an end portion in a form of a T-slide 524, although example embodiments are not limited thereto. For instance, alternatively, the back boss structure 520 may include an end portion in a form of a dovetail slide.

Additionally, the back boss structure 520 defines a bolt hole 522 configured to receive a bolt for securing the back boss structure 520 within the back slot 512 of the base structure 510. In an example embodiment, turning the bolt in a first direction causes the back boss structure 520 to protract from the back slot 512 of the base structure 510. Conversely, turning the bolt in an opposite second direction causes the back boss structure 520 to retract within the back slot 512 of the base structure 510.

Furthermore, the back boss structure 520 defines a notch 526 and a chamfer portion 528. The chamfer portion 528 is at a corner of the back boss structure 520 and is adjacent to the notch 526. In an example embodiment, the configuration of the chamfer portion 528 reduces or prevents the potential for interference with the fillet welds of the bracket 200. The notch 526 is below an overhanging end portion of the back boss structure 520 that includes the T-slide 524. The notch 526 of the back boss structure 520 is configured to engage with a spacer 530 during certain situations (e.g., a spacer 530 is used when a probe 400 is stabilized with a swing gate).

Figure 37:
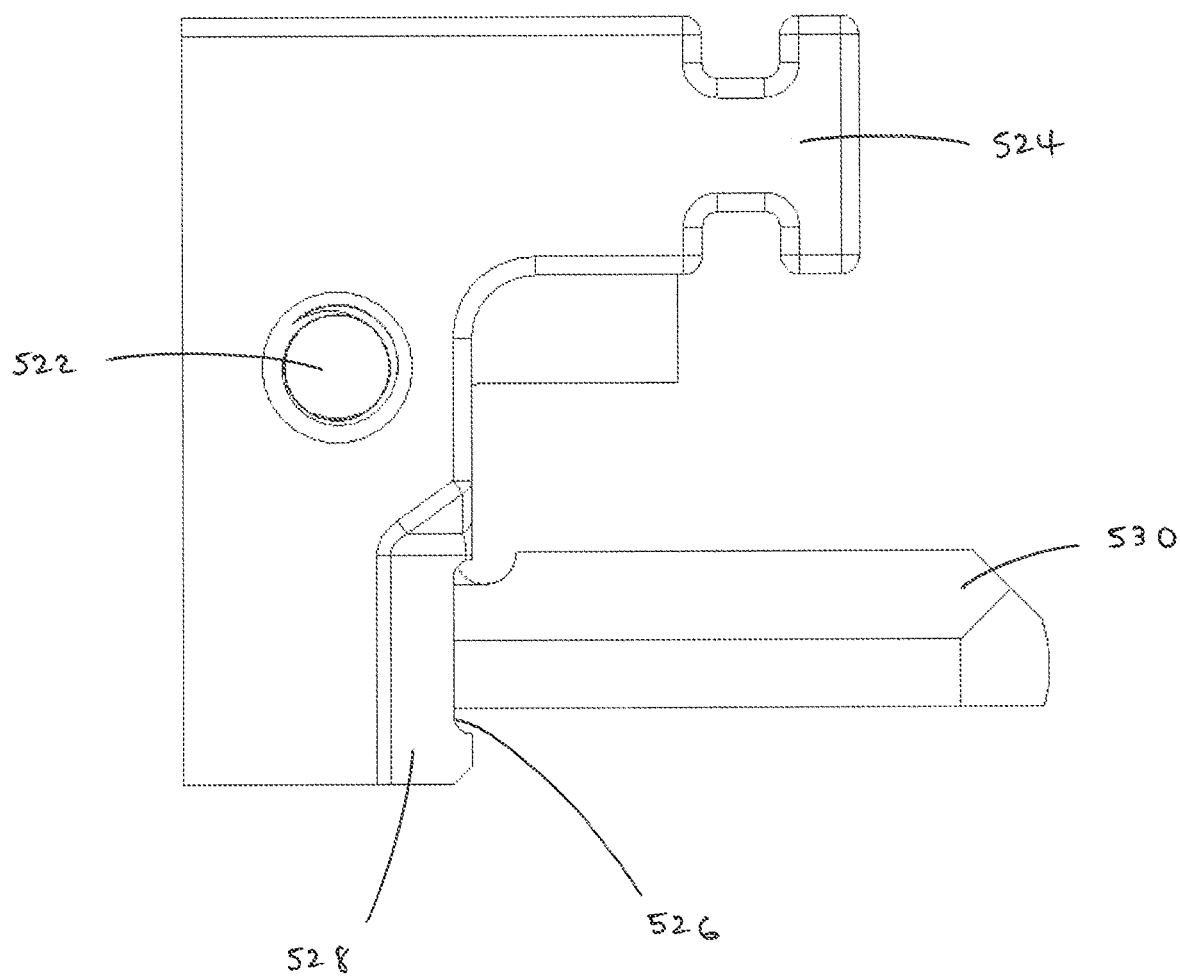
FIG. 37 is a side view of an engagement of a back boss structure with a spacer of the reinforcement assembly of FIG. 13.

FIG. 37 is a side view of an engagement of a back boss structure with a spacer of the reinforcement assembly of FIG. 13. Referring to FIG. 37, the indented portion 536 (e.g., FIG. 21) of the spacer 530 is configured to engage (e.g., interlock) with the notch 526 of the back boss structure 520. Such an engagement facilitates the proper positioning of the spacer 530 (e.g., in the event a preload in the reinforcement assembly 500 is lost or reduced during a seismic event). The notch 526 in the back boss structure 520 also increases the overall clearance between the reinforcement assembly 500 and the liner 100 of the spent fuel pool 1000. In an example, embodiment, the reinforcement assembly 500 does not contact the liner 100 of the spent fuel pool 1000.

Figure 38:
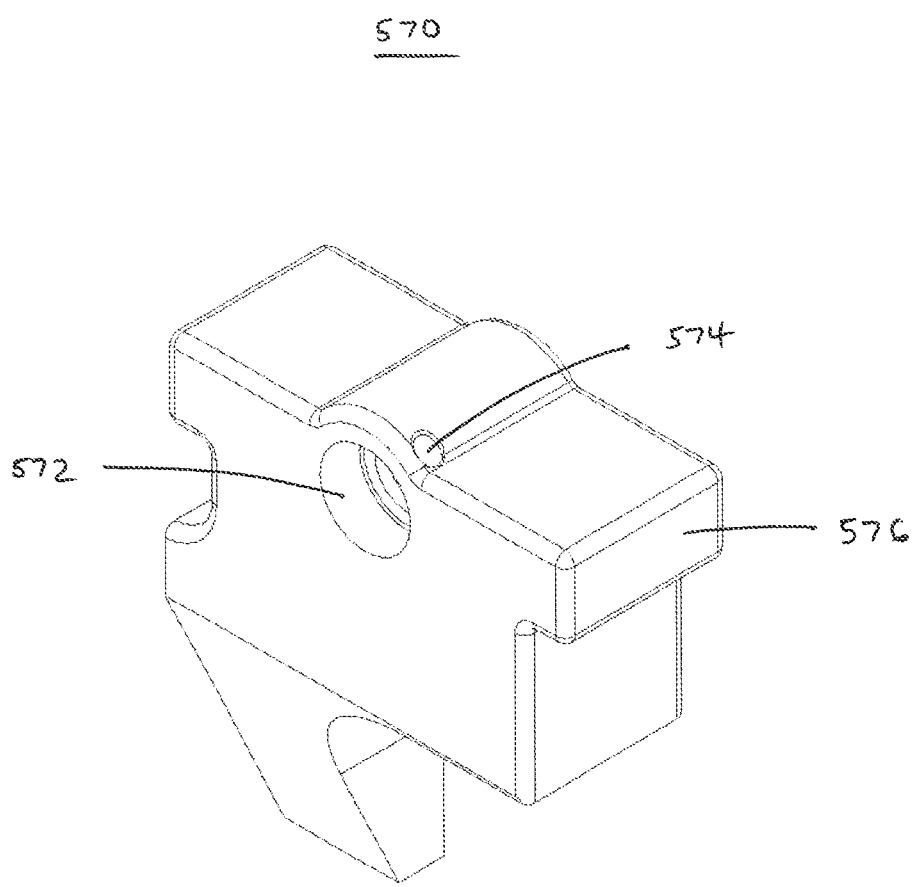
FIG. 38 is a perspective view of a front clamp of the components of the reinforcement assembly of FIG. 20.
Figure 39:
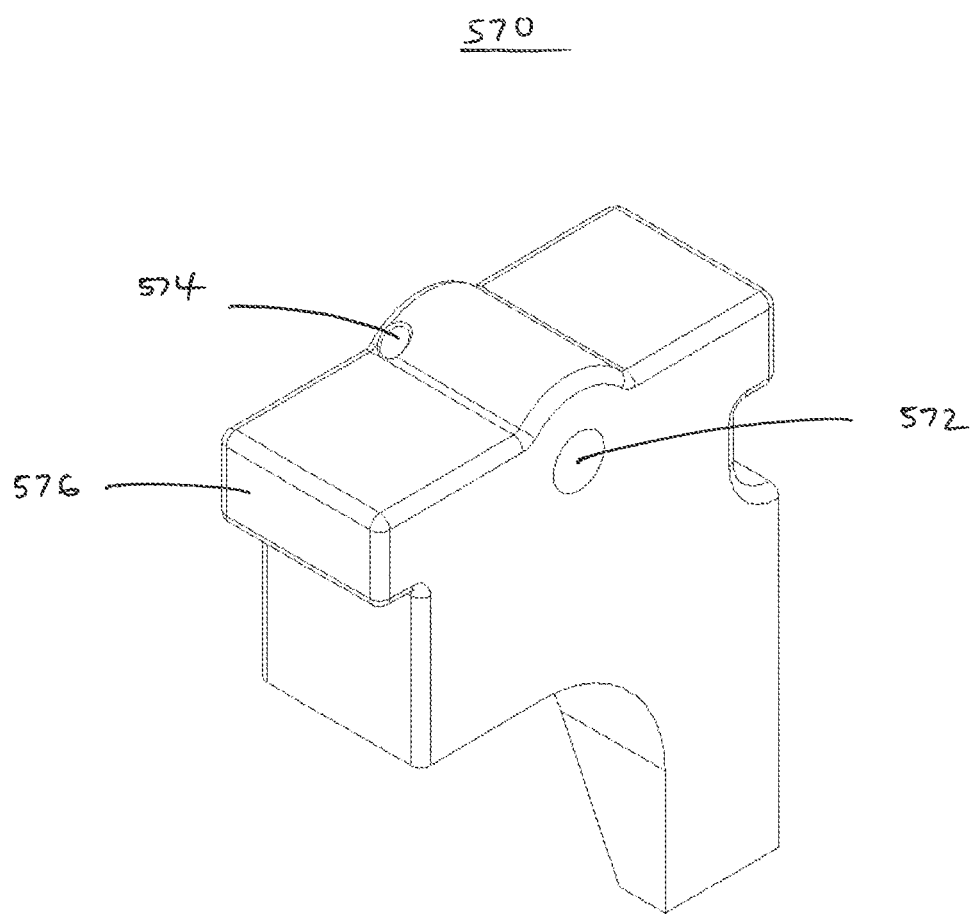
FIG. 39 is another perspective view of the front clamp of FIG. 38.

FIG. 38 is a perspective view of a front clamp of the components of the reinforcement assembly of FIG. 20. FIG. 39 is another perspective view of the front clamp of FIG. 38. Referring to FIGS. 38-39, a front clamp 570 includes an upper portion in a form of a T-slide 576. The T-slide 576 is configured to slidably engage with a front slot 518 of the base structure 510. The front clamp 570 defines a bolt hole 572 extending laterally through the front clamp 570. In addition, the front clamp 570 defines a pin hole 574 extending orthogonally to (e.g., vertically) and overlapping the bolt hole 572. As a result, as discussed supra, a pin can be inserted in the pin hole 574 to retain the bolt while still permitting the bolt to be turned to move the front clamp 570 within the front slot 518. In an example embodiment, turning the bolt in a first direction causes the front clamp 570 to protract from the front slot 518 of the base structure 510. Conversely, turning the bolt in an opposite second direction causes the front clamp 570 to retract within the front slot 518 of the base structure 510.

Figure 40:
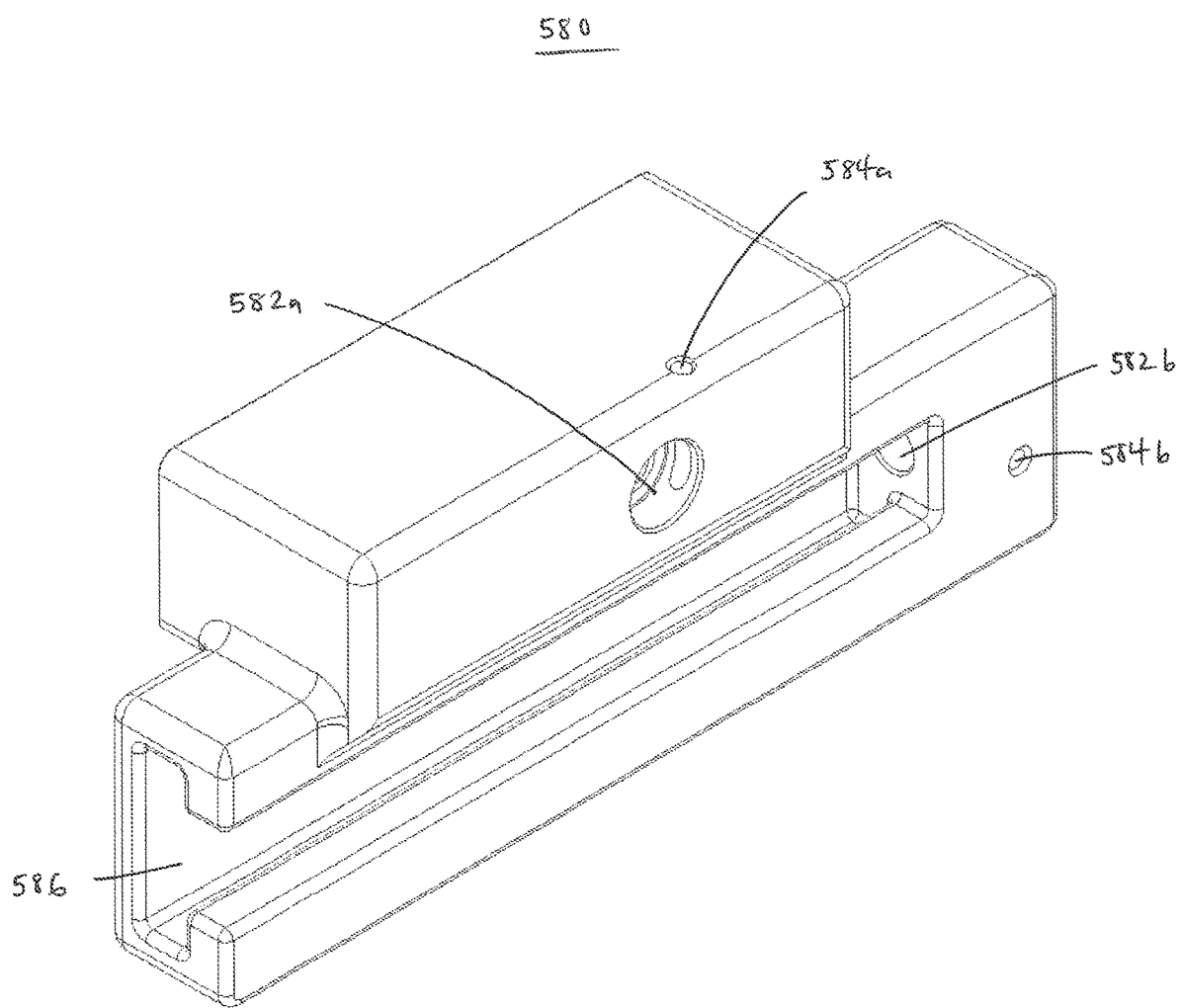
FIG. 40 is a perspective view of the linkage structure of the reinforcement assembly of FIG. 11.
Figure 41:
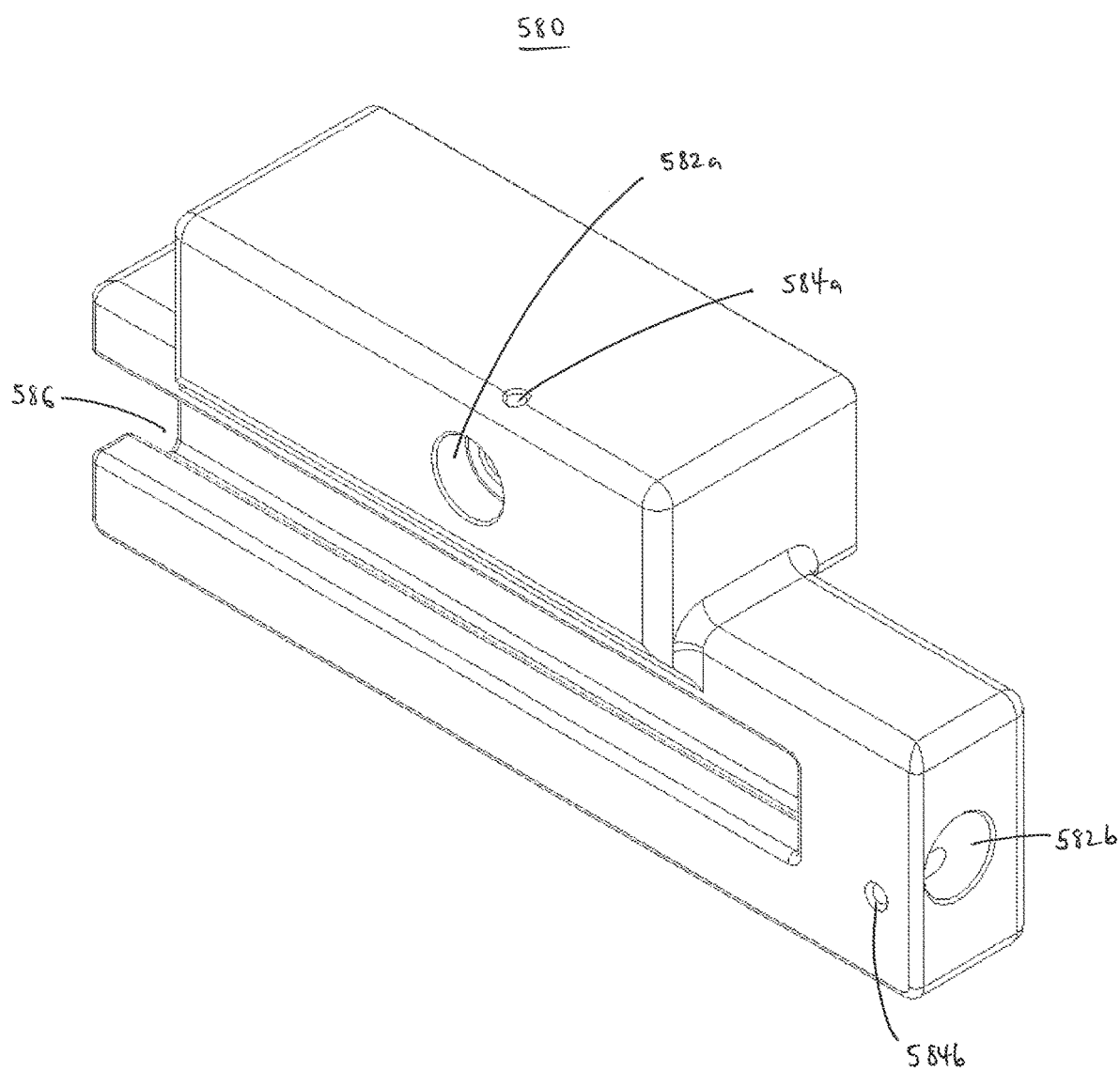
FIG. 41 is another perspective view of the linkage structure of FIG. 40.
Figure 42:
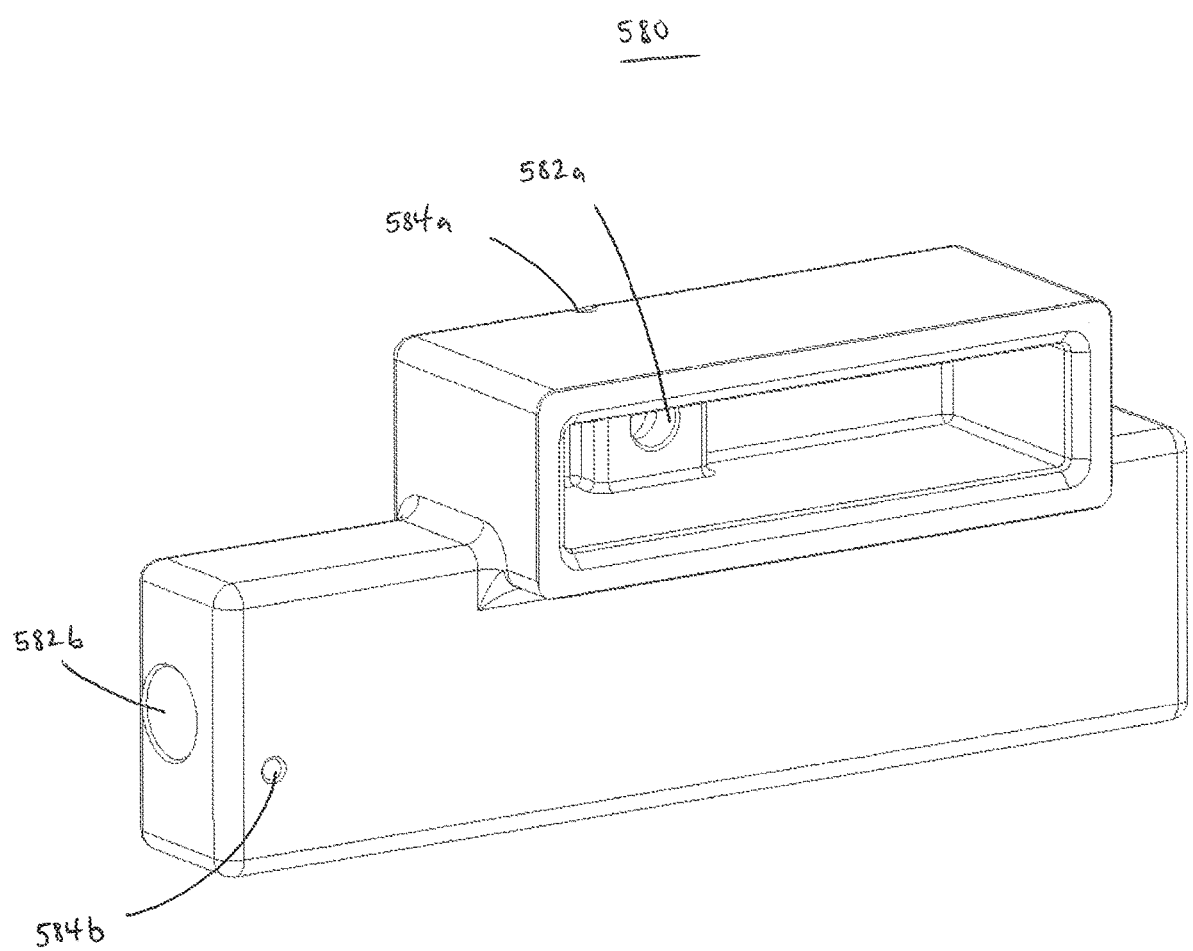
FIG. 42 is another perspective view of the linkage structure of FIG. 41.

FIG. 40 is a perspective view of the linkage structure of the reinforcement assembly of FIG. 11. FIG. 41 is another perspective view of the linkage structure of FIG. 40. FIG. 42 is another perspective view of the linkage structure of FIG. 41. Referring to FIGS. 40-42, a linkage structure 580 may be utilized when the reinforcement assembly 500 includes a swing gate (e.g., to stabilize the probe 400). The linkage structure 580 defines a bolt hole 582a extending laterally through the linkage structure 580. In addition, the linkage structure 580 defines a pin hole 584a extending orthogonally to (e.g., vertically) and overlapping the bolt hole 582a. Furthermore, as shown in FIG. 42, the linkage structure 580 defines a socket configured to engage with the protruding portion 511 of the base structure 510.

The degree of engagement between the socket (FIG. 42) of the linkage structure 580 and the protruding portion 511 of the base structure 510 can be set with a bolt engaged with the bolt hole 582a of the linkage structure 580 and the corresponding bolt hole of the base structure 510. A pin may also be inserted in the pin hole 584a to retain the bolt within the bolt hole 582a while still permitting the bolt to be turned to move the linkage structure 580 relative to the base structure 510. In an example embodiment, turning the bolt in a first direction causes the linkage structure 580 to move outwards and away from the base structure 510. Conversely, turning the bolt in an opposite second direction causes the linkage structure 580 to move back towards the base structure 510. In this manner, the reinforcement assembly 500 can accommodate the normal offset between the cooling pipe 300 and the probe 400 (e.g., normal offset of 320 mm±12.5 mm from axial centerlines).

As shown in FIG. 40, the side of the linkage structure 580 opposite from the socket (FIG. 42) defines a horizontal slot 586. The horizontal slot 586 is configured to receive a swing gate. The horizontal slot 586 is in a form of a T-slot, although example embodiments are not limited thereto. For instance, alternatively, the horizontal slot 586 may be in a form of a dovetail slot.

Additionally, the linkage structure 580 defines a bolt hole 582b extending axially through the linkage structure 580. The linkage structure 580 also defines a pin hole 584b extending orthogonally to (e.g., horizontally) and overlapping the bolt hole 582b. The position of the swing gate within the horizontal slot 586 of the linkage structure 580 can be set with a bolt engaged with the bolt hole 582b of the linkage structure 580 and the corresponding bolt hole of the swing gate. A pin may be inserted in the pin hole 584b to retain the bolt within the bolt hole 582b while still permitting the bolt to be turned to move the swing gate relative to the linkage structure 580. In an example embodiment, turning the bolt in a first direction causes the swing gate to protract from the horizontal slot 586 of linkage structure 580. Conversely, turning the bolt in an opposite second direction causes the swing gate to retract into the horizontal slot 586 of the linkage structure 580. In this manner, the reinforcement assembly 500 can accommodate the tangential offset between the cooling pipe 300 and the probe 400 (e.g., tangential offset of ±10 mm from axial centerlines).

Figure 43:
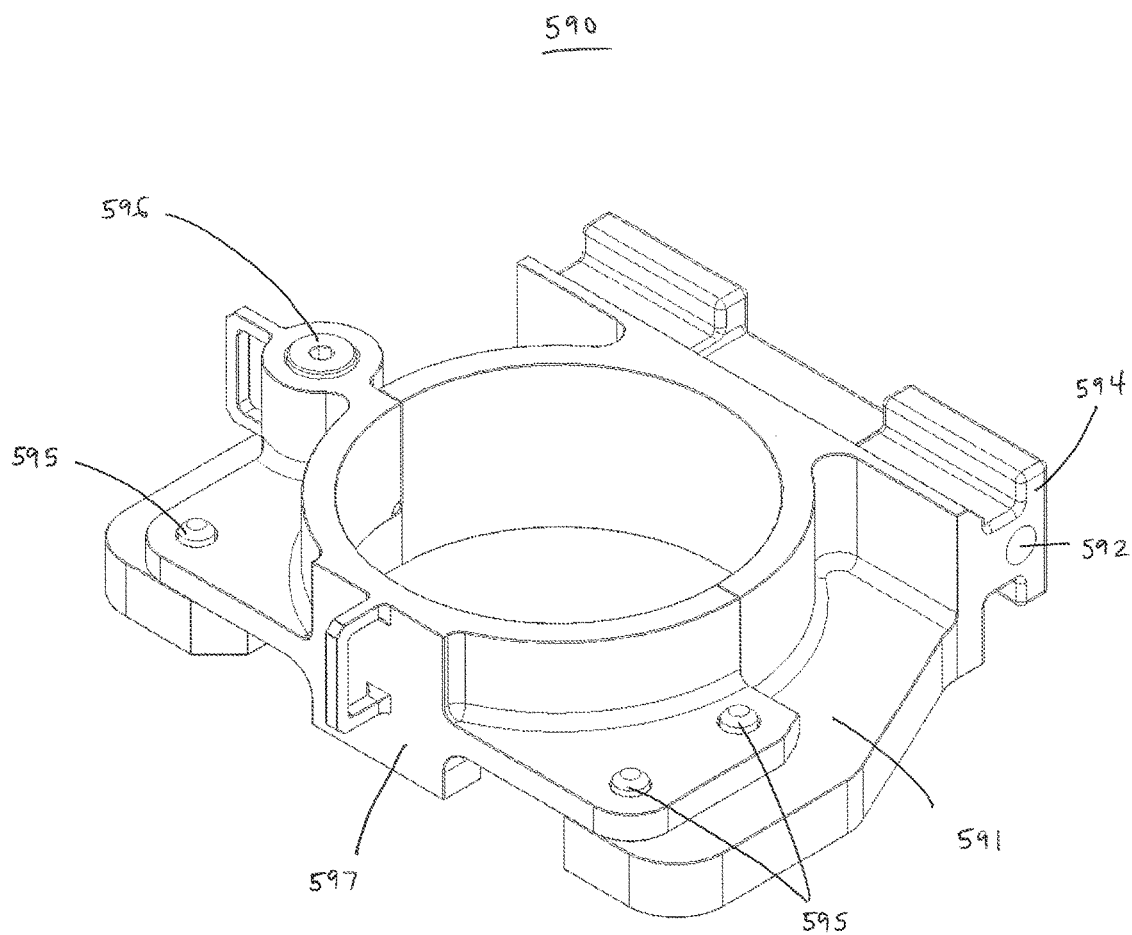
FIG. 43 is a perspective view of the swing gate of the reinforcement assembly of FIG. 11.
Figure 44:
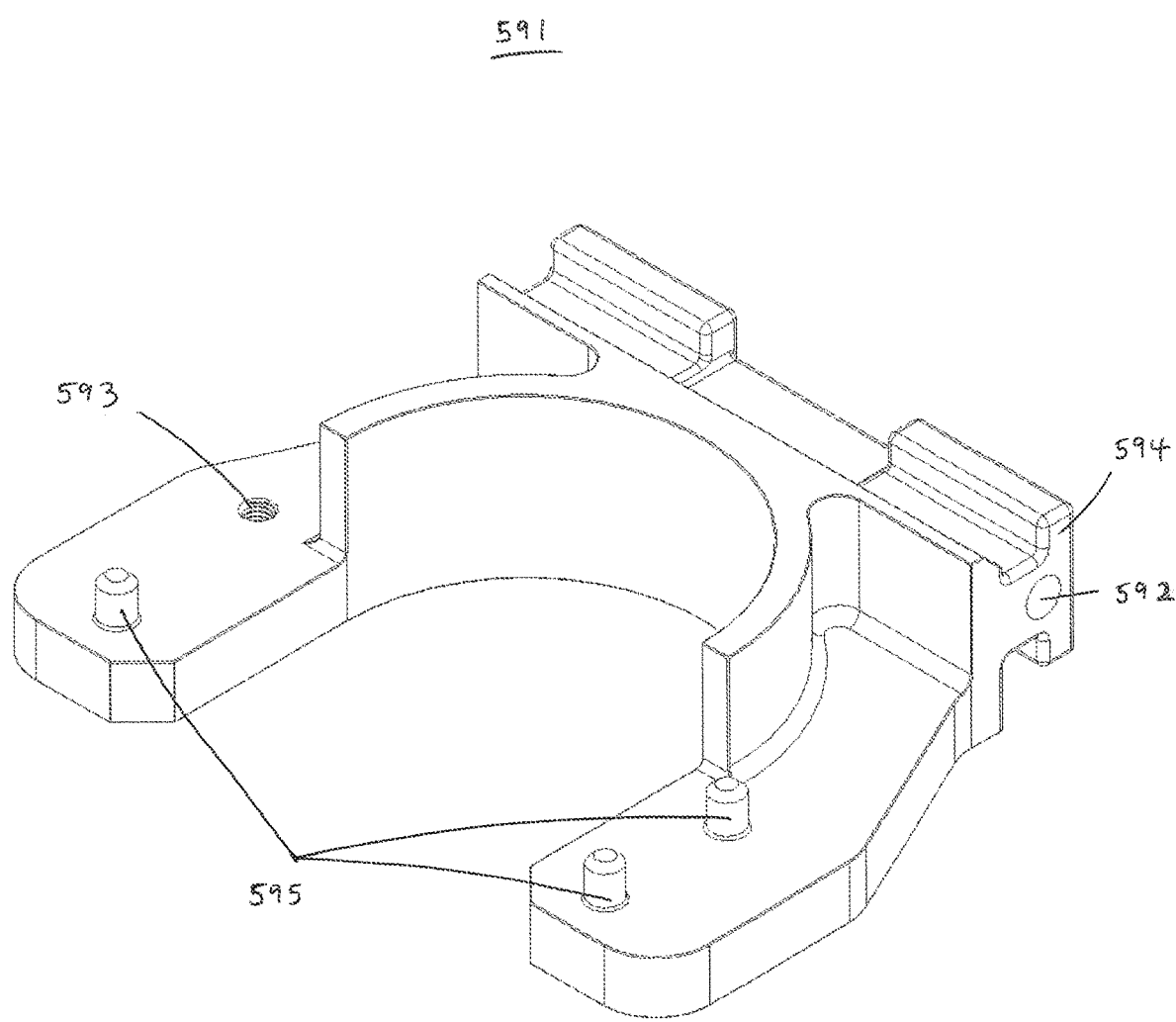
FIG. 44 is a perspective view of the gate base of the swing gate of FIG. 43.
Figure 45:
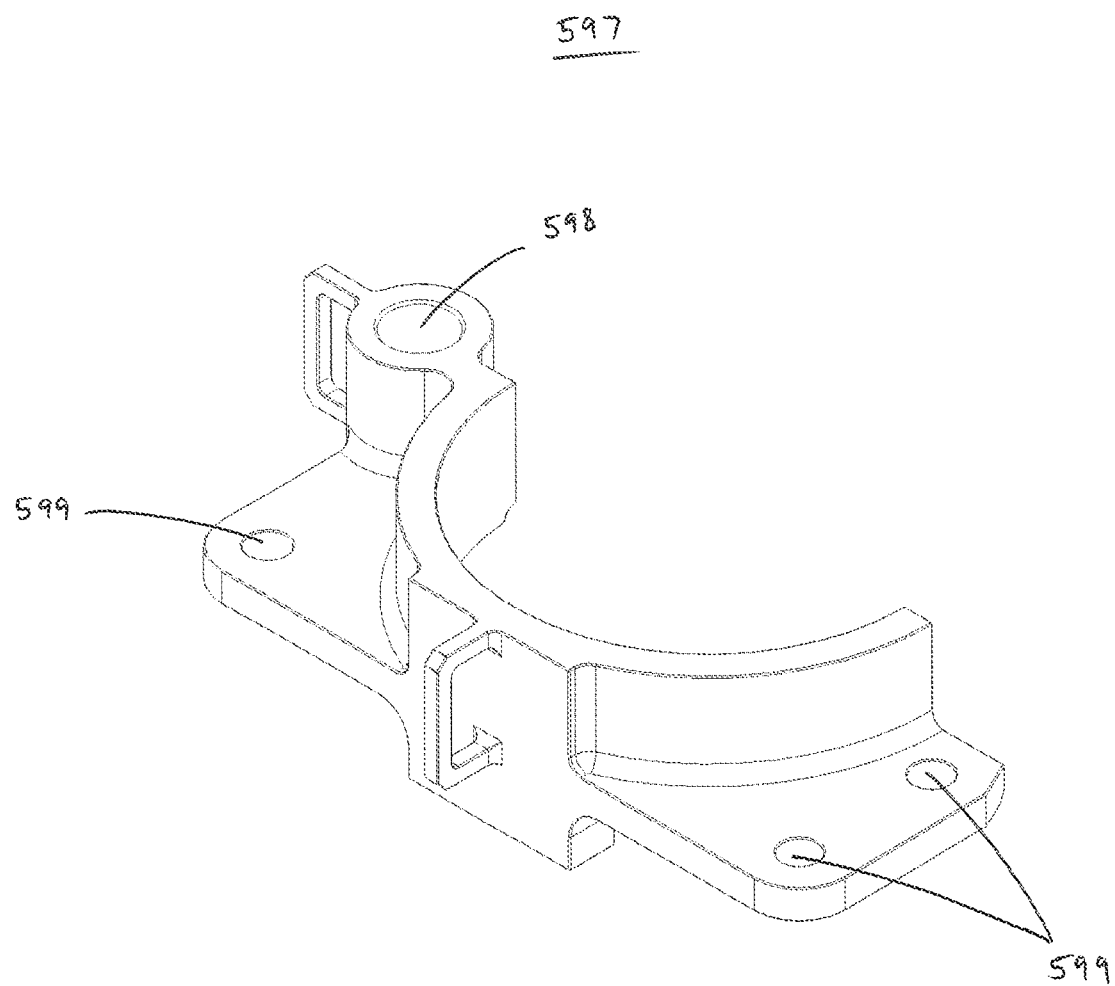
FIG. 45 is a perspective view of the gate latch of the swing gate of FIG. 43.

FIG. 43 is a perspective view of the swing gate of the reinforcement assembly of FIG. 11. FIG. 44 is a perspective view of the gate base of the swing gate of FIG. 43. FIG. 45 is a perspective view of the gate latch of the swing gate of FIG. 43. Referring to FIGS. 43-45, the reinforcement assembly 500 may include a swing gate 590 configured to be connected to the base structure 510 via the linkage structure 580. The swing gate 590 includes a gate base 591 and a gate latch 597 configured to open and close (e.g., to receive and stabilize a probe 400). The gate base 591 defines a bolt hole 593 and includes projections 595 on its upper surface. The projections 595 may be integrally formed as part of the gate base 591. Alternatively, one or more of the projections 595 may be in the form of a protruding pin that is interference fit within a hole in the gate base 591.

The gate latch 597 defines a bolt hole 598 and apertures 599 that correspond to the projections 595 of the gate base 591. A bolt 596 is configured to engage with the bolt hole 598 of the gate latch 597 and the bolt hole 593 of the gate base 591 so as to function as a pivot. In an example embodiment, the bolt 596 may be a shoulder bolt, and a spring may be retained by the bolt 596 so as to apply a downward force on the gate latch 597, thereby helping to maintain a status quo of the swing gate 590 (e.g., a closed state). As a result, to open the swing gate 590, an upward force on the gate latch 597 (e.g., via a handle) is needed to compress the spring retained by the bolt 596 (and to clear the projections 595) before the gate latch 597 can be swung open.

The gate base 591 of the swing gate 590 includes a portion in a form of a T-slide 594, although example embodiments are not limited thereto. For instance, alternatively, the gate base 591 of the swing gate 590 may include an end portion in a form of a dovetail slide. The gate base 591 of the swing gate 590 also defines a bolt hole 592 (e.g., partially threaded bolt hole) that extends along and between the T-slides 594. In a non-limiting embodiment, only the portion of the bolt hole 592 between the two T-slides 594 is threaded (e.g., to reduce momentum from loads from the probe 400). Each of the T-slides 594 of the gate base 591 is configured to slidably engage with the horizontal slot 586 of the linkage structure 580. The position of the swing gate 590 within the horizontal slot 586 of the linkage structure 580 can be set with a bolt engaged with the bolt hole 582b of the linkage structure 580 and the bolt hole 592 of the gate base 591 of the swing gate 590.

Figure 46:
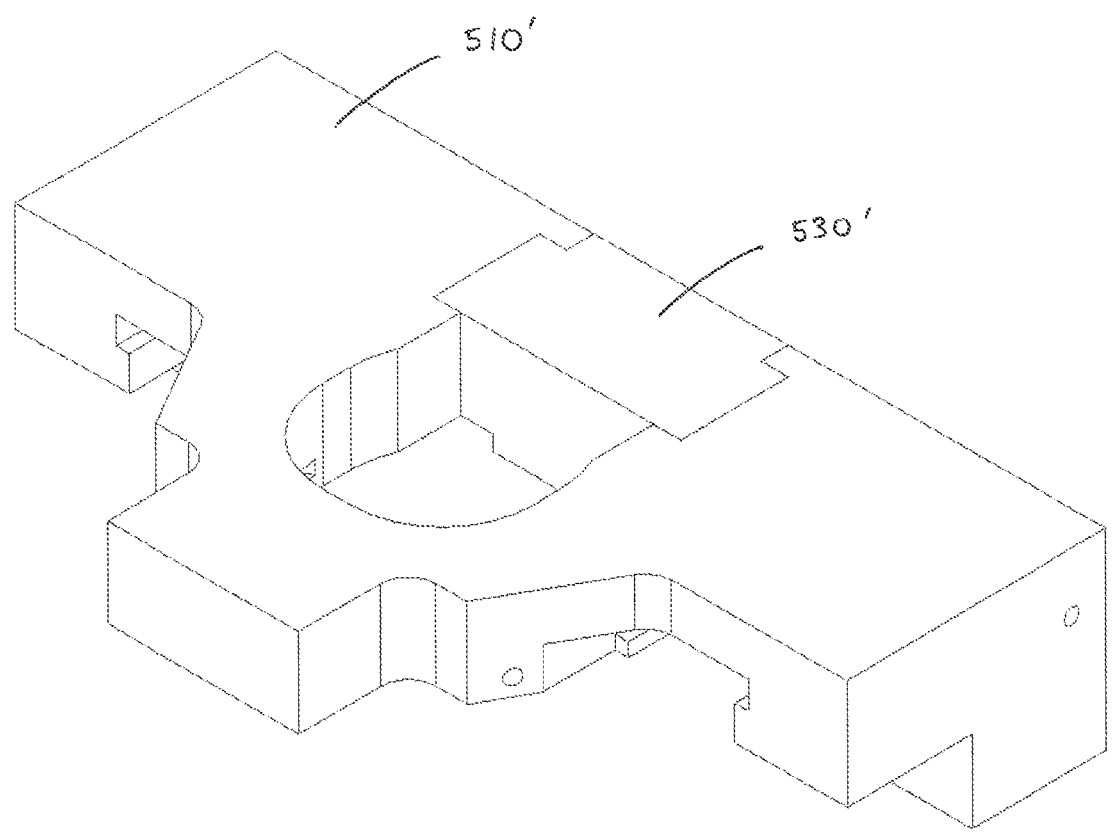
FIG. 46 is a perspective view of a base structure and spacer according to an example embodiment.
Figure 47:
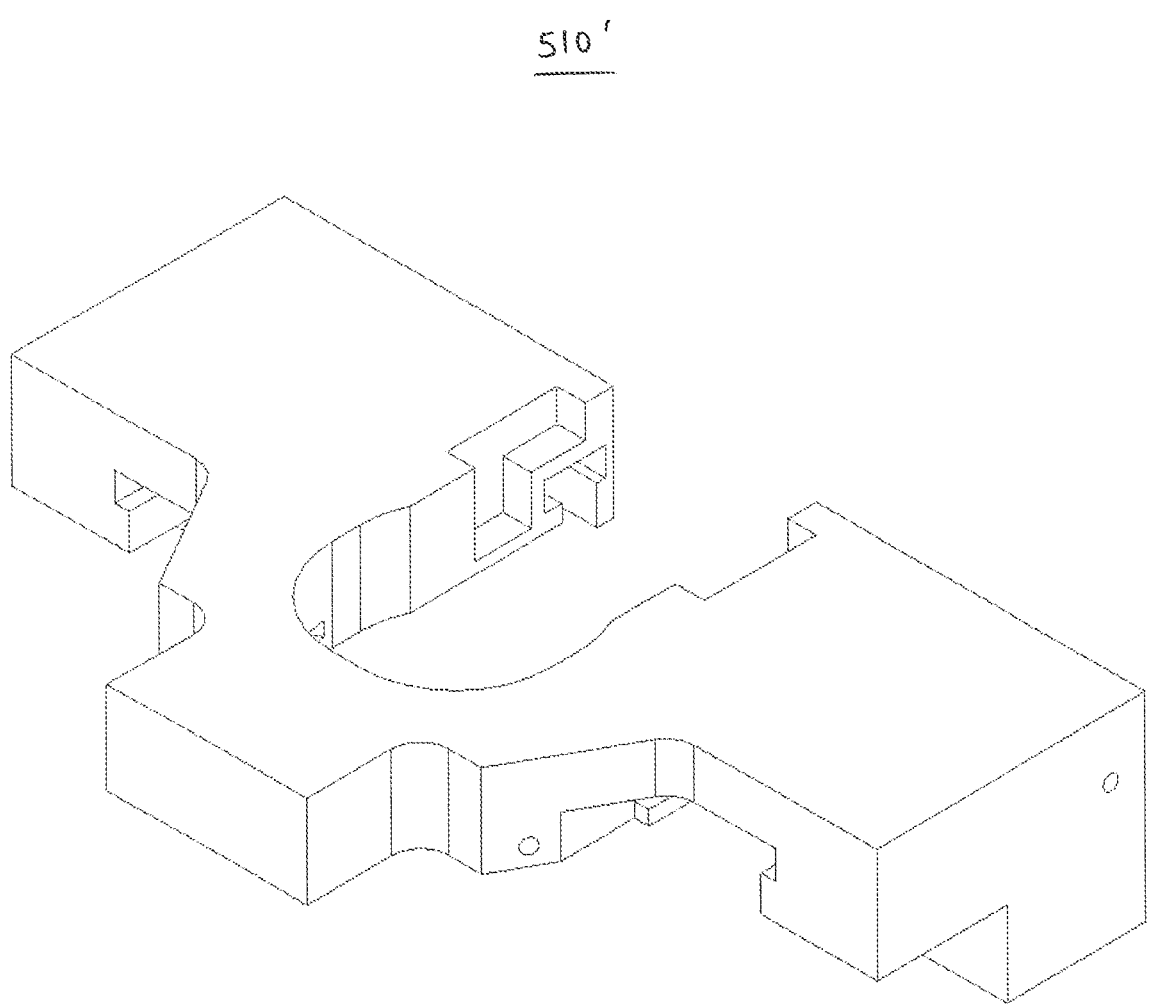
FIG. 47 is a perspective view of the base structure of FIG. 46.
Figure 48:
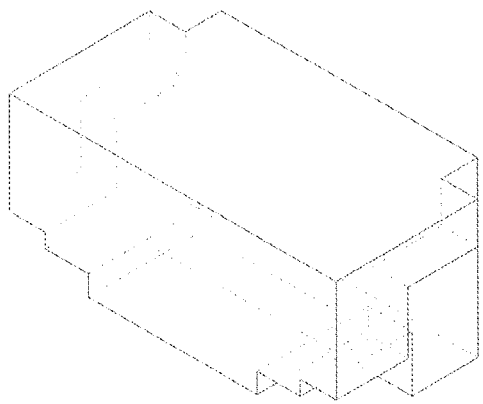
FIG. 48 is a perspective view of the spacer of FIG. 46 with hidden lines.

FIG. 46 is a perspective view of a base structure and spacer according to an example embodiment. FIG. 47 is a perspective view of the base structure of FIG. 46. FIG. 48 is a perspective view of the spacer of FIG. 46 with hidden lines. Referring to FIGS. 46-48, a reinforcement assembly includes a base structure 510' defining a spacer slot. A spacer 530' is configured to be received within the spacer slot so as to interlock with the base structure 510'. In an example embodiment, the spacer 530' is in a form of a monolithic structure.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. A reinforcement assembly for a bracket configured to constrain a cooling pipe of a spent fuel pool of a nuclear reactor, comprising:
   a base structure defining a pair of back slots, a pair of angled slots, a pair of side slots, and a pair of front slots;
   a pair of back boss structures configured to slidably engage with the pair of back slots of the base structure;
   a pair of pipe boss structures configured to slidably engage with the pair of angled slots of the base structure;
   a pair of side clamps configured to slidably engage with the pair of side slots of the base structure, each of the pair of side clamps defining a vertical slot;
   a pair of vertical clamps configured to slidably engage with the vertical slot of each of the pair of side clamps; and
   a pair of front clamps configured to slidably engage with the pair of front slots of the base structure.

2. The reinforcement assembly of claim 1, wherein the base structure is configured to cover the bracket.

3. The reinforcement assembly of claim 1, wherein the base structure is a monolithic component.

4. The reinforcement assembly of claim 1, wherein one or more of the pair of back slots, the pair of angled slots, the pair of side slots, the pair of front slots, and the vertical slot include a portion in a form of a T-slot.

5. The reinforcement assembly of claim 1, wherein the pair of back boss structures are configured to move away from each other to contact the bracket.

6. The reinforcement assembly of claim 1, wherein each of the pair of back boss structures has a slidable range of ±12.5 mm.

7. The reinforcement assembly of claim 1, wherein the pair of pipe boss structures are configured to protrude inward from the base structure and toward each other.

8. The reinforcement assembly of claim 1, wherein each of the pair of pipe boss structures has a slidable range of ±17.5 mm.

9. The reinforcement assembly of claim 1, wherein the pair of side clamps are configured to move toward each other to contact the bracket.

10. The reinforcement assembly of claim 1, wherein each of the pair of side clamps has a slidable range of ±12.5 mm.

11. The reinforcement assembly of claim 1, wherein the pair of vertical clamps are configured to move toward the base structure so as to contact a bottom surface of the bracket.

12. The reinforcement assembly of claim 1, wherein each of the pair of vertical clamps has a slidable range of ±8.5 mm.

13. The reinforcement assembly of claim 1, wherein the pair of front clamps are configured to move into the base structure and toward the pair of back slots so as to contact the bracket.

14. The reinforcement assembly of claim 1, wherein each of the pair of front clamps has a slidable range of ±12.5 mm.

15. The reinforcement assembly of claim 1, further comprising:
   at least one spacer configured to engage with at least one of the pair of back boss structures.

16. The reinforcement assembly of claim 15, wherein the at least one spacer is configured to be pressed against the bracket by the pair of back boss structures.

17. The reinforcement assembly of claim 15, wherein the at least one spacer is configured to allow for centroid loading through a center of rotation of a local cross-section of the bracket to reduce torsional shear stress.

18. The reinforcement assembly of claim 15, wherein the at least one spacer is in a form of two spacers.

19. The reinforcement assembly of claim 15, wherein the at least one spacer is in a form of a single spacer.

20. The reinforcement assembly of claim 1, further comprising:
   a linkage structure connected to the base structure; and
   a swing gate connected to the linkage structure, the swing gate configured to hold and stabilize a probe pipe relative to the cooling pipe.

* * * * *